(12) United States Patent
Pimmel et al.

(10) Patent No.: US 9,456,007 B2
(45) Date of Patent: Sep. 27, 2016

(54) SESSION AWARE NOTIFICATIONS

(75) Inventors: Kim P. Pimmel, San Francisco, CA (US); Jon Lorenz, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1032 days.

(21) Appl. No.: 12/271,854

(22) Filed: Nov. 15, 2008

(65) Prior Publication Data
US 2014/0032634 A1    Jan. 30, 2014

(51) Int. Cl.
*G06F 15/173* (2006.01)
*H04L 29/06* (2006.01)

(52) U.S. Cl.
CPC ....... *H04L 65/1069* (2013.01); *H04L 65/4076* (2013.01); *H04L 65/4084* (2013.01)

(58) Field of Classification Search
CPC ........... H04L 65/1069; H04L 65/4076; H04L 65/4084
USPC ................ 709/225, 227, 224; 713/156, 159; 726/26
See application file for complete search history.

(56) References Cited

U.S. PATENT DOCUMENTS

| | | | |
|---|---|---|---|
| 7,124,443 B2 | 10/2006 | Ishibashi et al. | |
| 7,725,002 B2 * | 5/2010 | Nakajima et al. | 386/326 |
| 7,904,929 B1 | 3/2011 | Jaunin et al. | |
| 2001/0034771 A1 | 10/2001 | Hutsch et al. | |
| 2002/0081971 A1 | 6/2002 | Travostino | |
| 2002/0132616 A1 | 9/2002 | Ross et al. | |
| 2003/0200313 A1 | 10/2003 | Peterka et al. | |
| 2003/0217142 A1 * | 11/2003 | Bobde et al. | 709/224 |
| 2004/0193680 A1 | 9/2004 | Gibbs et al. | |
| 2004/0219983 A1 | 11/2004 | Giobbi | |
| 2005/0091118 A1 | 4/2005 | Fano | |
| 2005/0091595 A1 * | 4/2005 | Shappell et al. | 715/700 |
| 2005/0147130 A1 | 7/2005 | Hurwitz et al. | |
| 2005/0239454 A1 | 10/2005 | Kawashima et al. | |
| 2006/0009155 A1 | 1/2006 | Paalasmaa et al. | |
| 2006/0139687 A1 | 6/2006 | Ohara et al. | |
| 2006/0205402 A1 | 9/2006 | Banavar et al. | |
| 2006/0236097 A1 | 10/2006 | Prologo et al. | |
| 2007/0138302 A1 | 6/2007 | Antoniou | |
| 2007/0162971 A1 * | 7/2007 | Blom et al. | 726/17 |
| 2007/0180494 A1 * | 8/2007 | Casey et al. | 726/2 |
| 2007/0183342 A1 | 8/2007 | Wong et al. | |
| 2007/0223370 A1 * | 9/2007 | Spear | 370/218 |
| 2007/0234048 A1 * | 10/2007 | Ziv | 713/159 |
| 2007/0268911 A1 * | 11/2007 | Alve | 370/395.52 |
| 2008/0010457 A1 | 1/2008 | Lee et al. | |
| 2008/0040283 A1 | 2/2008 | Morris | |
| 2008/0109888 A1 * | 5/2008 | Ullah | 726/7 |
| 2008/0133736 A1 * | 6/2008 | Wensley et al. | 709/224 |

(Continued)

OTHER PUBLICATIONS

"U.S. Appl. No. 12/271,855, Non-Final Office Action mailed Jun. 28, 2010", 8 pgs.

(Continued)

*Primary Examiner* — Thuong Nguyen
(74) *Attorney, Agent, or Firm* — Shook, Hardy & Bacon L.L.P

(57) ABSTRACT

User device information, identifying a first plurality of devices associated with a first user, is stored. A first device of the first plurality of devices is identified as being active. Data pertaining to an interaction session, within which the first user is participating, is provided to the first device based on the determination that the first device is active.

21 Claims, 33 Drawing Sheets

(56) References Cited

U.S. PATENT DOCUMENTS

| | | |
|---|---|---|
| 2008/0147798 A1 | 6/2008 | Paalasmaa et al. |
| 2008/0167015 A1 | 7/2008 | Vishwanathan et al. |
| 2008/0201479 A1* | 8/2008 | Husain et al. ............... 709/227 |
| 2008/0310819 A1* | 12/2008 | Akiyama et al. ............... 386/94 |
| 2009/0083132 A1 | 3/2009 | Doganaksoy et al. |
| 2009/0089293 A1* | 4/2009 | Garritano et al. ............. 707/10 |
| 2009/0094370 A1 | 4/2009 | Jacob et al. |
| 2009/0298514 A1 | 12/2009 | Ullah |
| 2009/0307361 A1 | 12/2009 | Issa et al. |
| 2009/0307759 A1 | 12/2009 | Schnell et al. |
| 2010/0011103 A1 | 1/2010 | Luzzatti et al. |
| 2010/0022254 A1* | 1/2010 | Ashfield et al. ........... 455/456.6 |
| 2010/0043060 A1 | 2/2010 | Reuzel et al. |
| 2010/0146051 A1 | 6/2010 | Agrawal et al. |
| 2014/0032483 A1 | 1/2014 | Tulley et al. |
| 2014/0032627 A1 | 1/2014 | Lorenz et al. |
| 2014/0032634 A1 | 1/2014 | Pimmel et al. |

OTHER PUBLICATIONS

"U.S. Appl. No. 12/271,855, Final Office Action mailed Dec. 10, 2010", 10 pgs.

"U.S. Appl. No. 12/271,855, Response filed Mar. 9, 2011 to Final Office Action mailed Dec. 10, 2011", 9 pgs.

"U.S. Appl. No. 12/271,855, Response filed Sep. 28, 2010 to Non-Final Office Action mailed Jun. 28, 2010", 8 pgs.

U.S. Appl. No. 12/271,853, Response filed Feb. 13, 2012 to Non Final Office Action mailed Oct. 11, 2011, 17 pgs.

U.S. Appl. No. 12/271,853, Final Office Action mailed May 31, 2012, 24 pgs.

U.S. Appl. No. 12/271,853, Non Final Office Action mailed Oct. 11, 2011, 17 pgs.

U.S. Appl. No. 12/271,355, Non Final Office Action mailed Feb. 17, 2012, 12 pgs.

U.S. Appl. No. 12/271,855, Non Final Office Action mailed Feb. 17, 2012, 12 pgs.

"U.S. Appl. No. 12/271,853, Non Final Office Action mailed Dec. 20, 2012", 17 pgs.

"U.S. Appl. No. 12/271,853, Response filed Oct. 25, 2012 to Final Office Action mailed May 31, 2012", 16 pgs.

"U.S. Appl. No. 12/271,855, Non Final Office Action mailed Feb. 27, 2013", 13 pgs.

"U.S. Appl. No. 12/271,855, Non Final Office Action mailed Aug. 30, 2012", 11 pgs.

"U.S. Appl. No. 12/271,855, Response filed Nov. 30, 2012 to Non-Final Office Action mailed Aug. 30, 2012", 9 pgs.

Final Office Action dated Aug. 1, 2013 in U.S. Appl. No. 12/271,855, 16 pages.

Final Office Action dated Sep. 3, 2013 in U.S. Appl. No. 12/271,853, 21 pages.

Non-Final Office Action dated Oct. 7, 2014 in U.S. Appl. No. 12/271,853, 21 pages.

Final Office Action dated Jul. 29, 2015 in U.S. Appl. No. 12/271,853, 25 pages.

Non-Final Office Action dated Jun. 7, 2011 in U.S. Appl. No. 12/271,859, 8 pages.

Non-Final Office Action dated Sep. 29, 2011 in U.S. Appl. No. 12/271,859, 13 pages.

Final Office Action dated Mar. 15, 2012 in U.S. Appl. No. 12/271,859, 12 pages.

Non-Final Office Action dated Dec. 2, 2014 in U.S. Appl. No. 12/271,859, 11 pages.

Notice of Allowance dated Jun. 2, 2015 in U.S. Appl. No. 12/271,859, 11 pages.

* cited by examiner

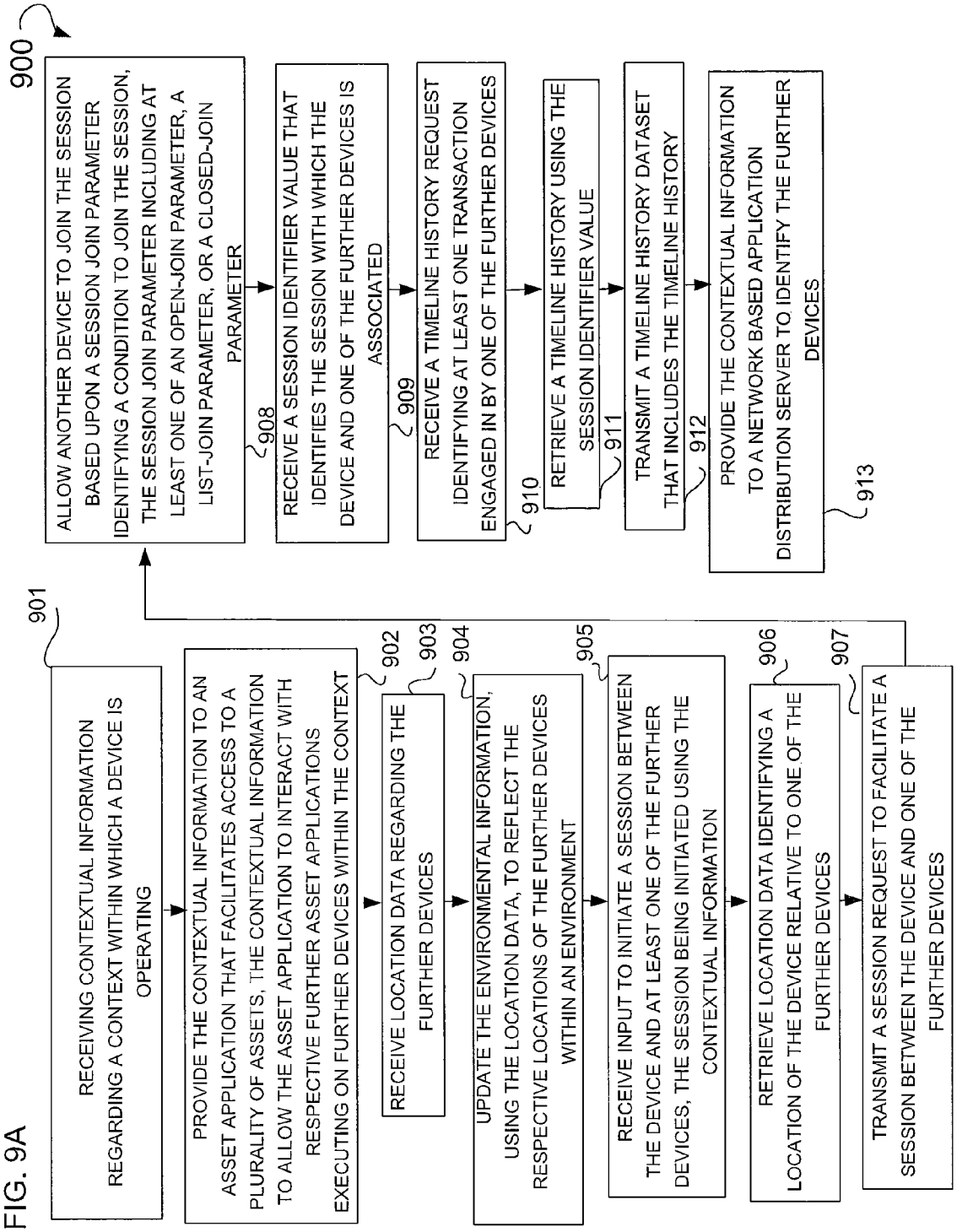

DETERMINE THAT A NETWORK DEVICE IS WITHIN A DETERMINABLE PROXIMITY OF A PHYSICAL STRUCTURE — 1701

SELECTIVELY PROVIDING DATA PERTAINING TO AN INTERACTION SESSION TO THE NETWORK DEVICE, VIA A NETWORK, BASED ON THE DETERMINATION, THE INTERACTION SESSION BEING BETWEEN A PLURALITY OF NETWORK DEVICES WITHIN THE DETERMINABLE PROXIMITY OF THE PHYSICAL STRUCTURE — 1702

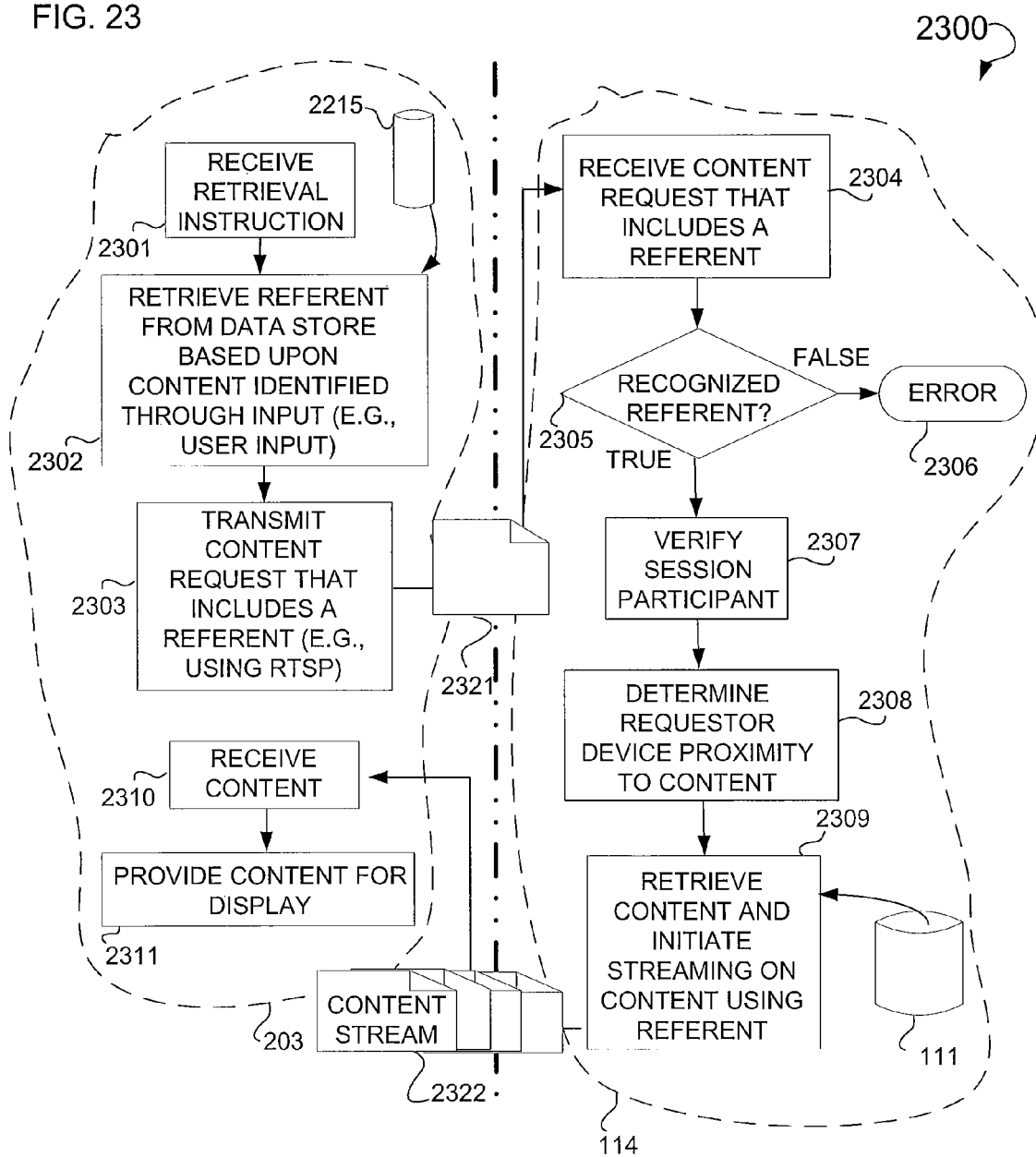

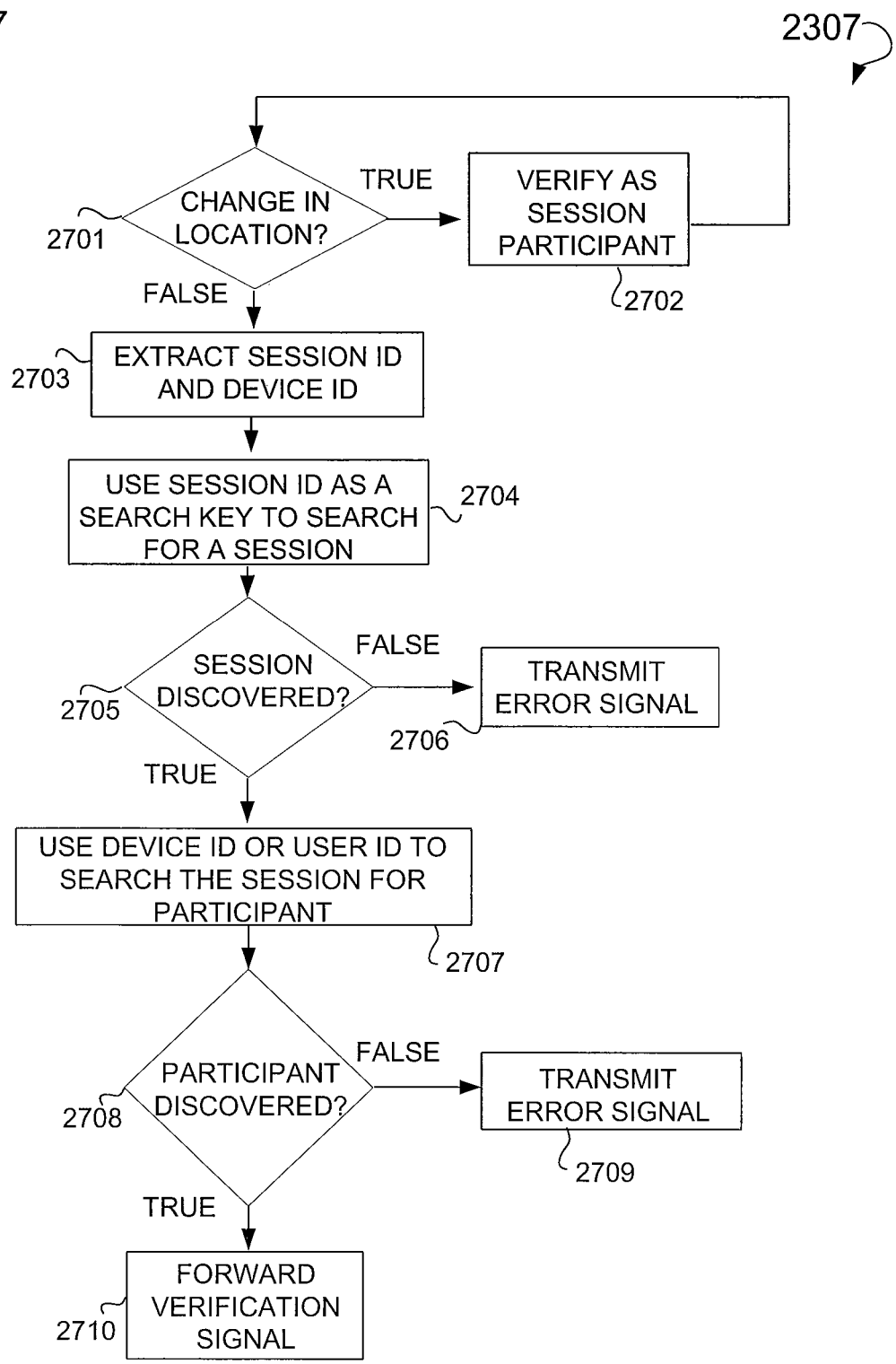

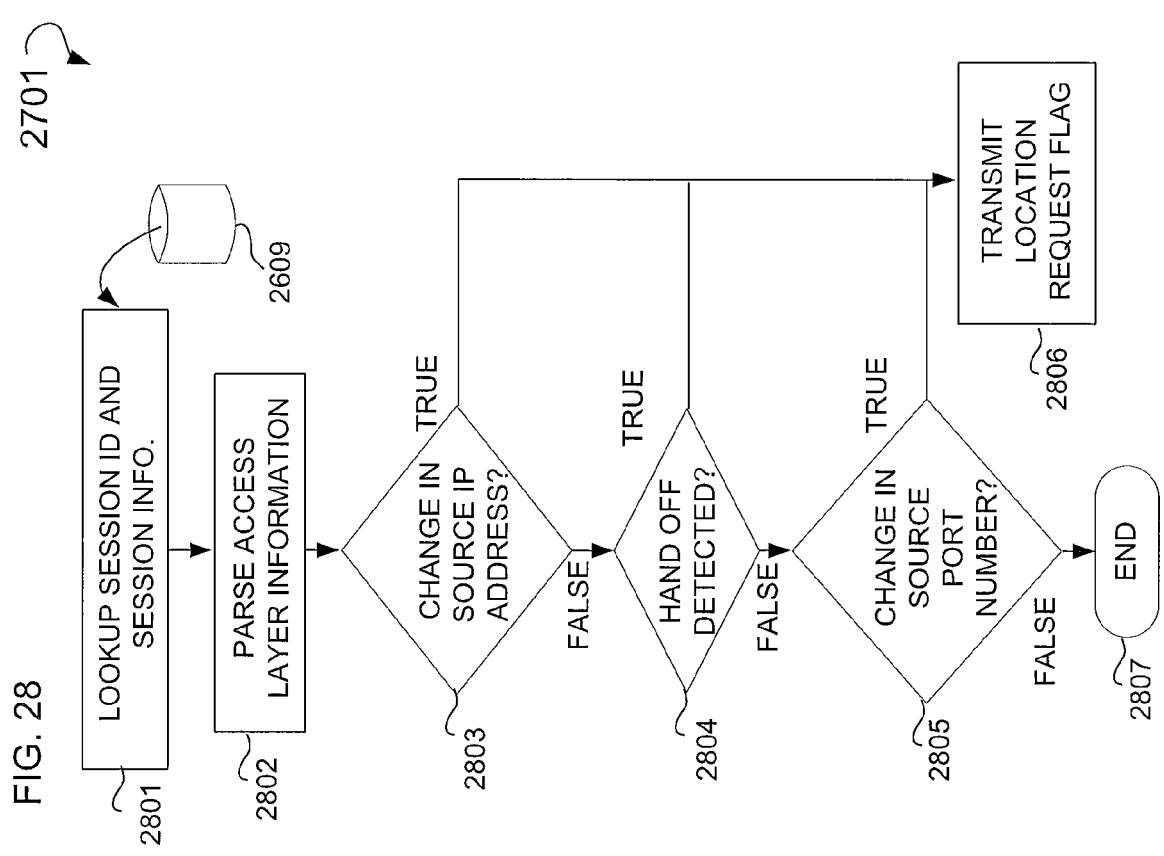

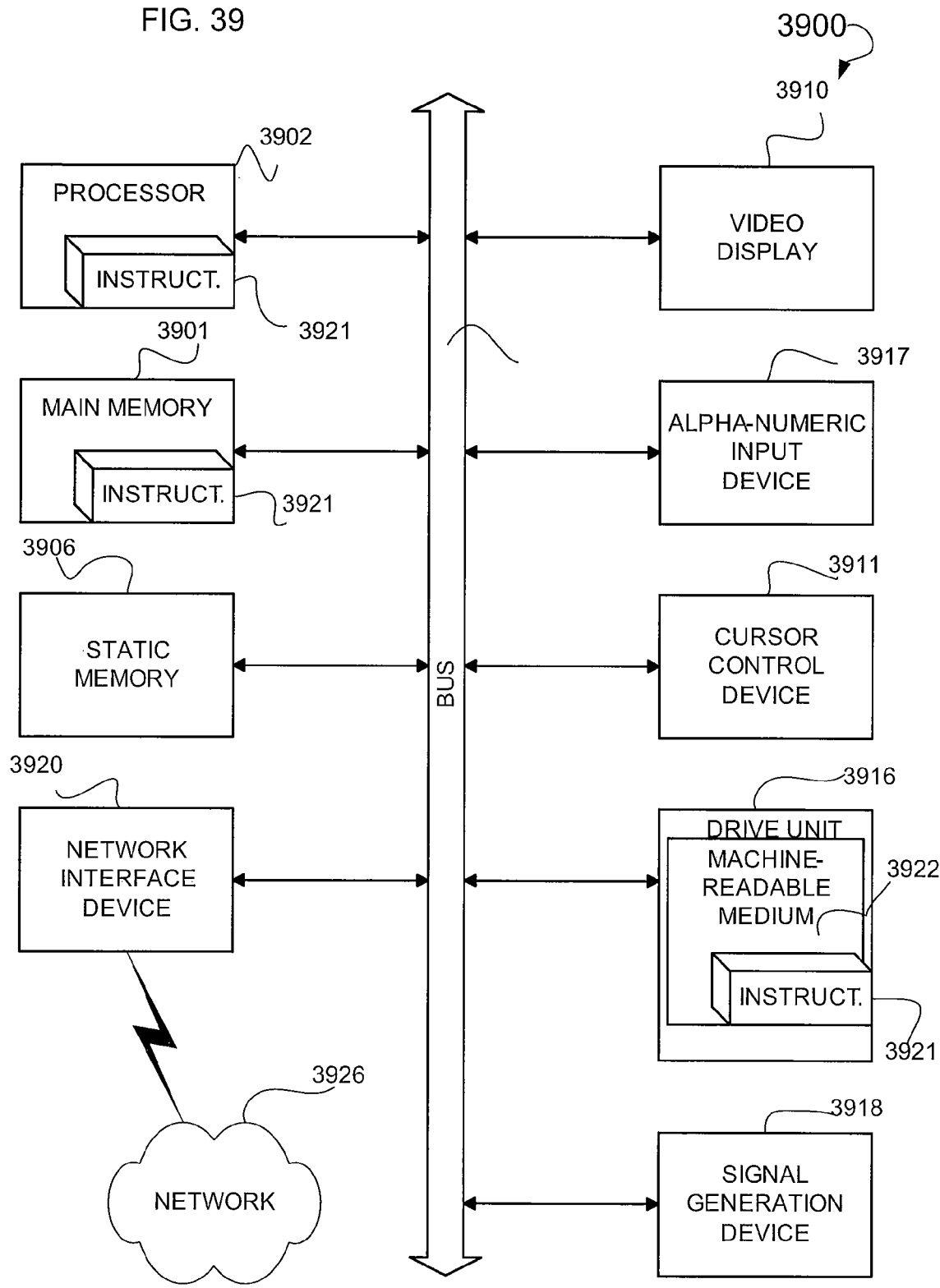

SESSION AWARE NOTIFICATIONS

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2008, Adobe Systems Incorporated. All Rights Reserved.

TECHNICAL FIELD

The present application relates generally to the technical field of algorithms and programming and, in one specific example, asset management.

BACKGROUND

Assets in the form of content and applications are distributed to one another using a number of protocols. These protocols include a Transmission Control Protocol (TCP), a Real Time Streaming Protocol (RTSP), and Hyper Text Transfer Protocol (HTTP). These protocols are used by devices that are connected via a logical or physical connection.

BRIEF DESCRIPTION OF THE DRAWINGS

Some embodiments are illustrated by way of example and not limitation in the figures of the accompanying drawings in which:

FIG. 9A is a flow chart illustrating a method, according to an example embodiment, used to distribute an asset based upon a context.

FIG. 17 is a flow chart illustrating a method, according to an example embodiment, used to identify a device serving as a proxy, where the device is associated with a physical structure.

FIG. 23 is a dual-stream flow chart illustrating a method, according to an example embodiment, used to facilitate content streaming as part of an asset sharing session.

FIG. 27 is a flow chart illustrating the execution of an operation, according to an example embodiment, that verifies the session participant.

FIG. 28 is a flow chart illustrating the execution of an operation, according to an example embodiment, that determines whether a change in location has occurred for a particular device and/or user associated with a device.

FIG. 29 is a flow chart illustrating the execution of an operation, according to an example embodiment, that verifies a session participant, wherein this session participant has changed locations.

FIG. 39 shows a diagrammatic representation of a machine in the form of a computer system, according to an example embodiment, that executes a set of instructions to perform any one or more of the methodologies discussed herein.

DETAILED DESCRIPTION

Figure 1:
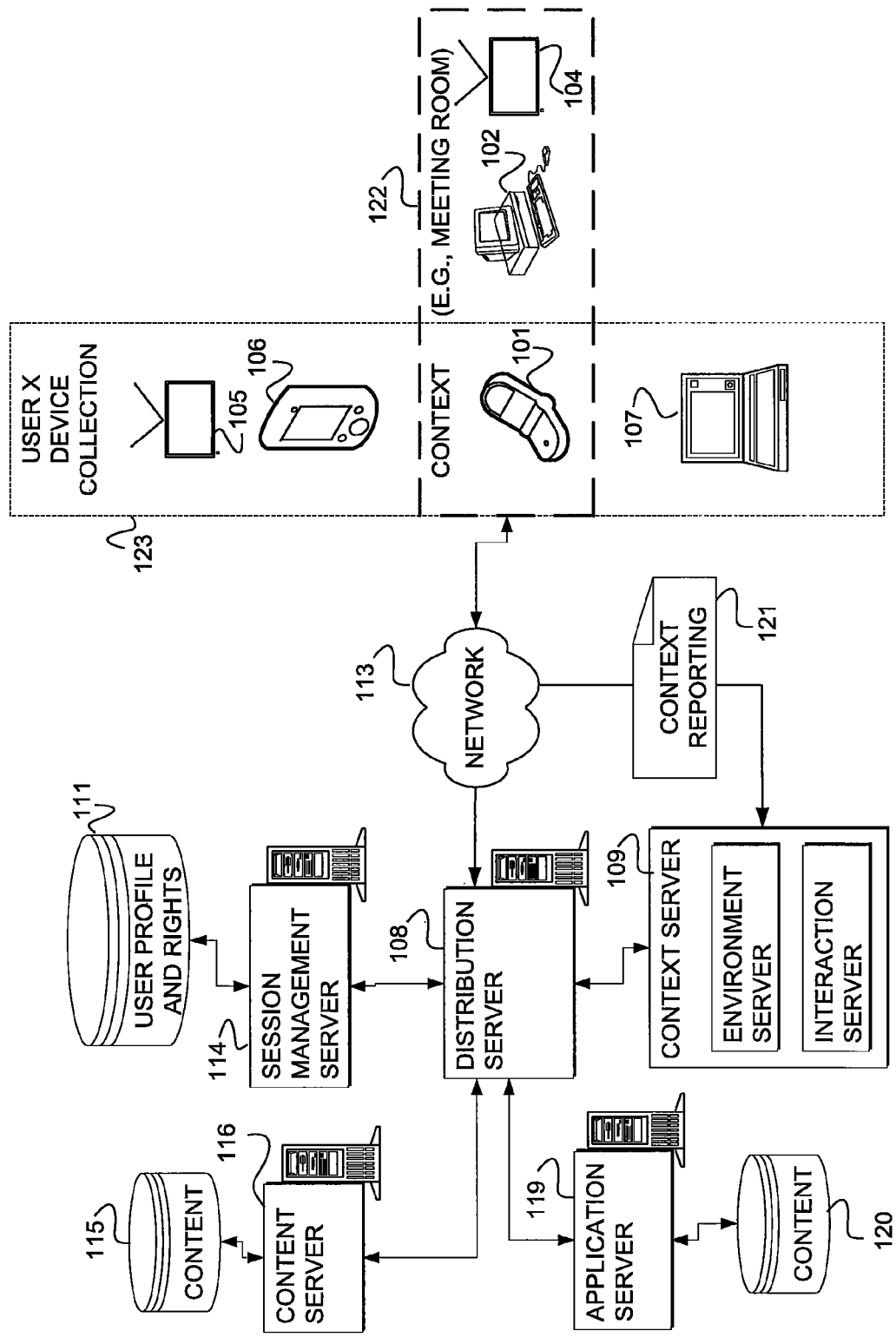
FIG. 1 is a diagram of a system, according to an example embodiment, illustrating the intersection between user devices and a context.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

In some example embodiments, a system and method is shown that initiates and manages an asset sharing based upon interaction between devices that participate in a context. This interaction may be based upon environmental considerations. Further, in some example embodiments, an asset sharing session (e.g., a session) is established where content is shared based upon content rights and the physical proximity of session participants. An interaction includes an exchanging of assets in the form of digital content or applications between devices via a network connection. A context is an association of devices to exchange these assets, while an environment is a description of attributes of this context. As used herein, a session may be an interactive session, or an asset sharing session. These attributes include proximity between devices and other descriptive information that describes the context. Proximity is a measure of distance. This measurement of distance may be determined through the use of an environment, a Global Positioning System (GPS), an Infra-Red (IR) connection, or determining a location of the device using a Radio Frequency Identifier (RFID).

A session is a semi-permanent interactive information exchange between communicating devices, and applications associated therewith, that is established at a certain time and torn down at a later time. Example sessions include an asset-sharing session, application-sharing session, content-mirroring session, and a content-rights sharing session. Sessions are identified by a unique ID value. Content rights are legally recognized rights (e.g., legal rights) of asset sharing session participants and include licensing rights, copyrights, contract rights, fair use rights, or other suitable rights. A session participant may be a user, or device identified by a user ID value or a device ID value. Through the use of an interactive context, environment, asset sharing session, content rights, and physical proximity, asset may be distributed between session participants. Assets includes audio content, video content, audio-video content, binary-executable files, textual content, or other suitable digital content.

In some example embodiments, a system and method is illustrated that manages the asset sharing session by providing an asset to the most recently active device. In some example cases, a plurality of devices is used by the same user participant in the asset sharing session. In such a scenario, a system and method is provided that transmits the asset to a recently active device. A recently active device is a device participating in a session that, relative to another device, has more recently received input, or generated output. Though using this system and method, a user receives an asset shared during the asset sharing session on the device that he or she is currently using.

In some example embodiments, a system and method is shown that allows asset sharing session participants to identify session participants associated with physical structures. This identification takes place through the use of the above referenced environment, GPS, IR connection, and/or RFID. Session participants associated with physical structures may be used as proxies for the session participant to participate in the asset sharing session. These proxies may engage in commercial transactions on behalf of the session participant. Further, through these proxies, assets may be provided to the session participant from the devices managing the asset sharing session.

Example System

FIG. 1 is a diagram of an example system 100 illustrating the intersection between user devices and a context. Shown is a user device collection, referenced herein at 123, that includes a number of devices (e.g., computing platforms). These devices utilized by a user include, for example, a television 105, PDA 106, cell phone 101, and laptop computer (e.g., "laptop") 107. In some example embodiments, one or more of these devices may participate in a context, referenced herein at 122, with other devices. These other devices include a computer 102 and a television 104. Within the context 122, the cell phone 101, computer 102, and television 104 may share an asset. In some example embodiments, one or more of the various devices in the context 122 may engage in context reporting through the generation of a context report 121. The context report 121 includes information relating to the devices and users participating in a context. The context report 121 is transmitted across the network 113 and is received by, for example, the distribution server 108. The context report 121 may be formatted using an eXtensible Markup Language (XML). The network 113 may be an Internet, a Local Area Network (LAN), a Wide Area Network (WAN), or some other suitable type of network as associated topology.

In some example embodiments, operatively connected to the network 113, is the previously referenced distribution server 108. Operatively connected includes a physical or logical connection. Operatively connected to the distribution server 108 may be a session management server 114, a context server 109, a content server 116, and an application server 119. These various servers (e.g., 108, 114, 109, and 116) may participate in a cloud computing paradigm. Additionally, these various servers may be implemented on a single computer system, or multiple computer systems. In some example embodiments, the distribution server 108 is used to manage data flowing from the context 122, and to route this data. The context server 109 includes an environment server and an interaction server. The interaction server tracks the interactions between devices in the context 122. Interactions include the sharing of assets between devices in the context 122. The environment server tracks the environment within which the interaction occurs. The environment includes data relating to the interaction such as the physical location of the devices participating in the context, the time and date of participation by the devices within the context 122, the amount and type of assets shared and other suitable information. The session management server 114 is used to establish and manage a session. A session is an environment that is uniquely identified via a unique numeric identifier (e.g., a session ID) so as to regulate participants in the session. Participants may use a session identifier in combination with a user ID and/or device ID to facilitate participation in a session. Operatively connected to the session management server 114 is a user profile and rights data store 111 that includes the session ID, the user ID, and/or device ID. Right include legal rights associated with an asset and its use. Additionally, illustrated is a content server 116 that serves an asset in the form of content to participants. This content is stored in the content database 115 that is operatively connected to the content server 116. Additionally, an application server 119 is shown that is used to serve applications to context participants. Applications include executables, modules, code modules, software components, modules, distributed software, and software applications. These applications are stored in the content database 120. These applications may be used to enhance, augment, supplement, or facilitate the functionality of one or more of the devices participating in the context 122.

A cloud computing paradigm is a network model in which information is permanently stored in servers on the Internet, and cached temporarily on clients that include computer system, televisions, cell phones, PDAs, smart phones, entertainment centers, table computers, notebooks, wall computers, handhelds, or other suitable devices. Here, for example, the network 113 has residing in it the session management server 114 and the content server 116. The cell phone 101 and television 104 receive the session ID value 108 and a content stream from the session management server 114 or content server 116. In some example embodiments, the ability of the cell phone 101 and television 104 to exchange content is contingent upon the participation in a session that is a product of the network 113 and the session management server 114, or content server 116 included therein.

Distributed software is a software architecture model where software components or modules are accessed across a network by a device and executed by this device on an as-needed basis. For example, one or more of the cell phone 101 and television 104 may access a software component or module residing on the session management server 114 or the content server 116 to complete certain calculations the result of which are displayed on one of the cell phone 101 and television 104. These components or modules may be written in an object-oriented computer language such that a component or module oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. Further, these components or modules may be linked together via various distributed programming protocols as distributed computing components or modules. For example, a component written in C++ using Common Object Request Broker Architecture (CORBA) or Simple Object Access Protocol (SOAP) can communicate with a remote component written in JAVA™. Suitable protocols include SOAP, CORBA, and other protocols well-known in the art.

Figure 2:
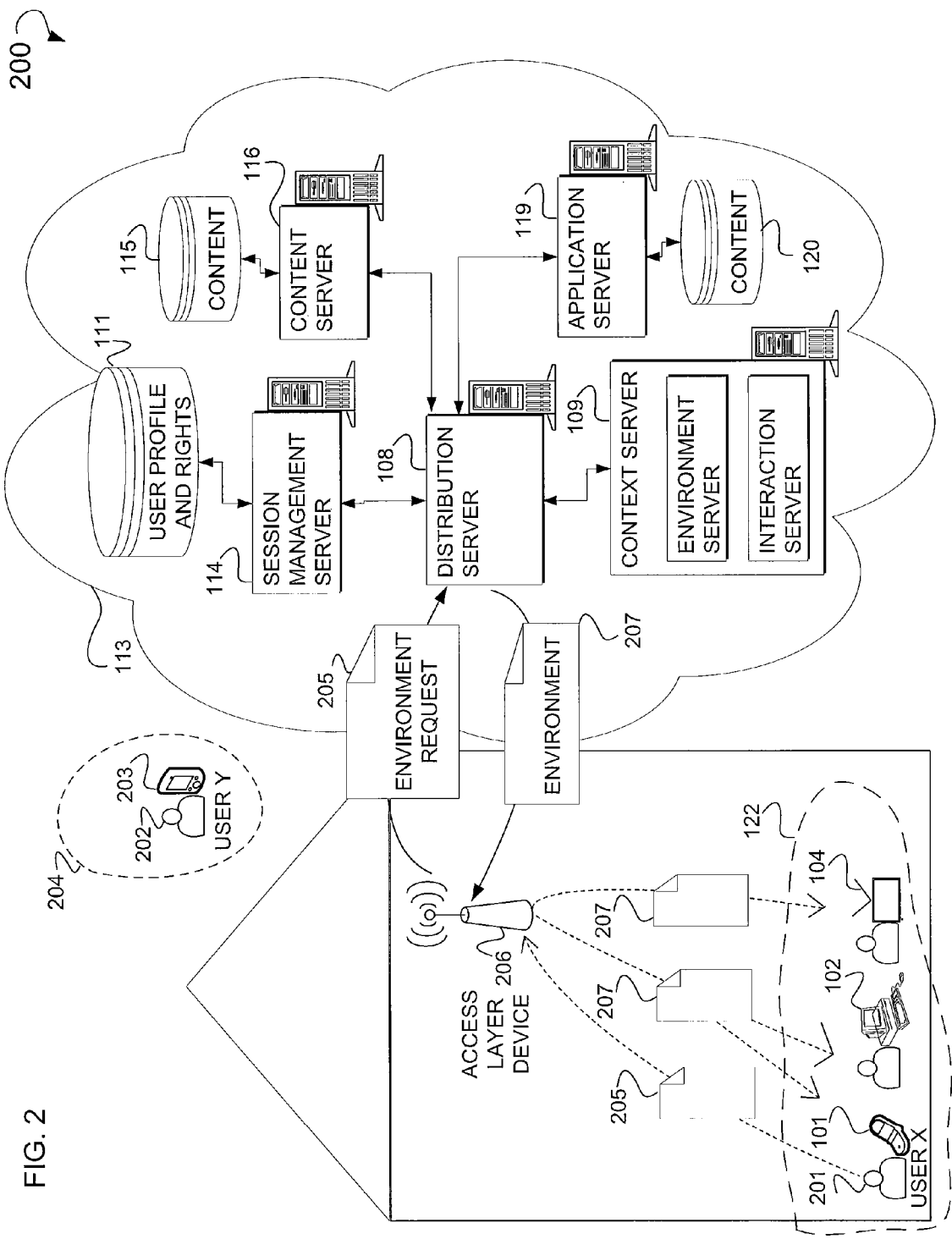
FIG. 2 is a diagram of a system, according to an example embodiment, used to retrieve an environment for use in participating in a context.

FIG. 2 is a diagram of an example system 200 used to retrieve an environment for use in participating in a context. Shown is a user 201, referenced as "user x," that is associated with the cell phone 101. This user 201 is also associated with the user device collection 123. Further, shown is the computer 102 and television 104. As previously illustrated in FIG. 1, the cell phone 101, computer 102, and television 104 all participate in the context 122. This context may be in the form of a meeting occurring in a physical structure. In some example embodiments, the user 201 generates an environment request 205 that is received by an access layer device 206. This access layer device 206 transmits this environment request 205 across the network 113. The environment request 205 may include information relating to the relative physical location context participants, where information pertaining to this relative location is requested via the environment request 205. The distribution server 108, or one of the other servers (e.g., 108, 114, 109, and 116), may transmit an environment 207. This environment 207 may be distributed by the access layer device 206 to one or more of the context participants (e.g., the cell phone 101, computer 102, or television 104). Additionally, illustrated is a user 202, referenced as a "user y." This user 202 may have their own context 204 in which the PDA 203 participates. In some example embodiments, the content 204 and context 122 may be combined together to form a single context. This combination of contexts may occur where the PDA 203 joins the context 122.

Figure 3:
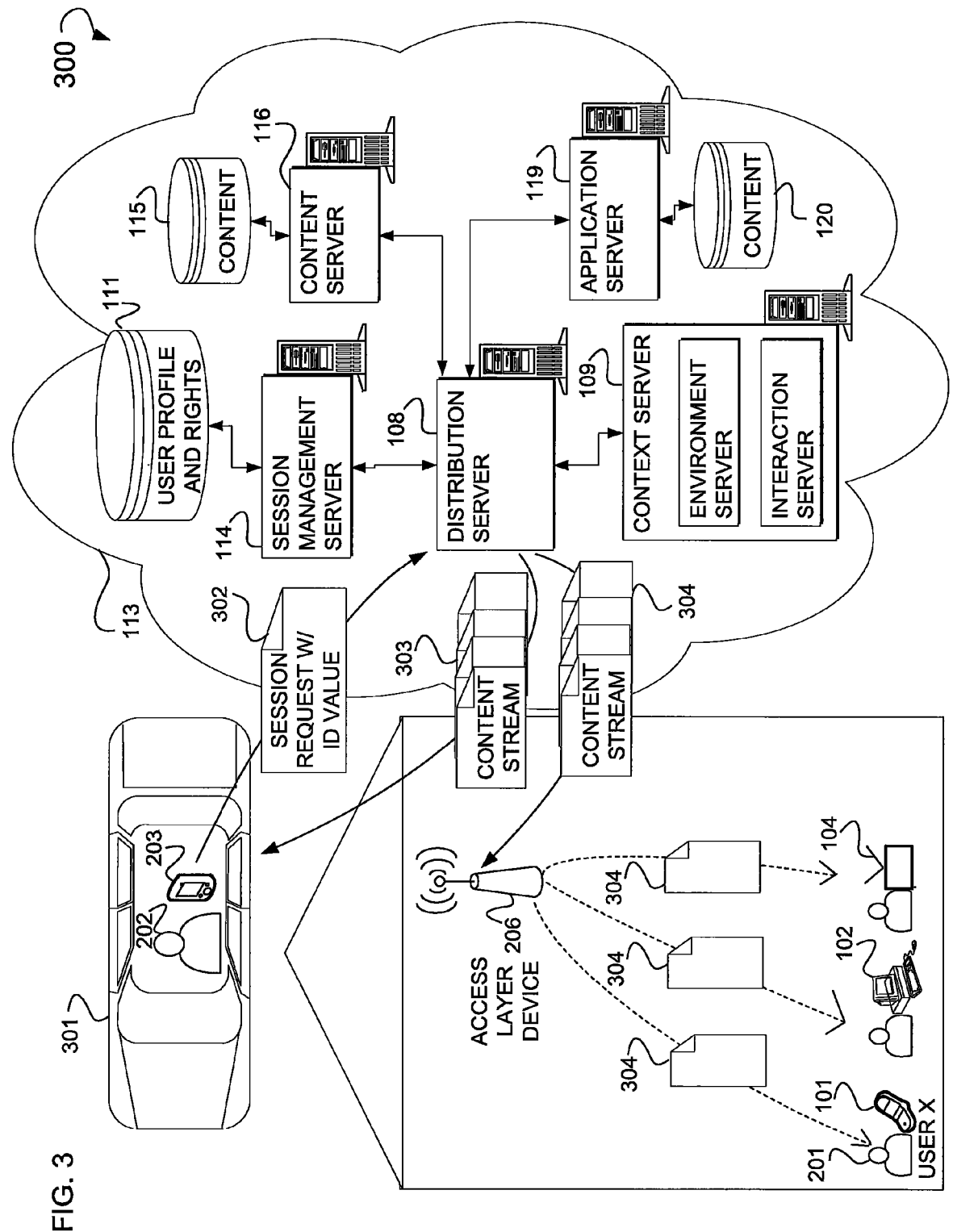
FIG. 3 is a diagram of a system, according to an example embodiment, illustrating a device joining an asset sharing session.

FIG. 3 is a diagram of an example system 300 illustrating a device joining an asset sharing session. Shown are the PDA 203, and an associated user 202, who attempt to join or otherwise re-establish a session with the session management server 114 via the distribution server 108. This session may be joined or re-established where the PDA 203 is no longer proximate to the access layer device 206. For example, here the PDA 203, and associated user 202, is in an automobile 301 that is not proximate to the access layer device 206. As illustrated, a session request 302 is transmitted by the PDA 203 and received by the session management server 114 via the distribution server 108. This session request 302 may include a session ID value along with a device ID value and/or a user ID value. The session ID value, device ID value, and user ID value may be formatted using a Session Description Protocol (SDP) as part of the session request 302. This session request 302 may be transmitted across the network 113. The session management server 114 may retrieve a content stream 303 from the content server 116. This content stream 303 is transmitted across to the network 113 to be received by the PDA 203. The content stream 303 may include content, or a portion of content, that the PDA 203 has not previously received due to the termination of a context, or asset sharing session. For example, if the PDA 203 was previously receiving the content stream 304 and the content stream 304 was abruptly ended, and the PDA 203 may attempt to re-establish participation in the asset sharing session. Where re-establishment is attempted to review the same content that was a part of the content stream 304, the content stream 303 may include a portion of the content stream 304 that the PDA 203 has not yet received. In some example embodiments, the content server 116 transmits the content stream 303 to the PDA 203 in lieu of the session management server 114 transmitting this content stream 303. Further, this content stream 303 may include a referent as opposed to actual content. A referent is a pointer to a location in memory. In some example cases, a Uniform Resource Identifier (URI), such as a Uniform Resource Locator (URL), is used in lieu of, or in combination with the pointer. This URI may be used to retrieve, identify, or access an asset. In some example embodiments, the session management server 114 may end an asset sharing session where a change is detected in the access layer device 206 that is receiving the content stream 304. This change may be in the form of a hand off being detected, a change in physical location as determined through the use of a GPS, a change in an IP address associated with the access layer device, or some other suitable basis.

In some example embodiments, a session ID value is a unique value used to identify a session. An example of a session ID value is a Globally Unique Identifier (GUID) value in the form of a 16 byte (128-bit) number. A device ID value is a unique value used to identify a device. Examples of device ID values include a Media Access Control (MAC) address, an Electronic Serial Numbers (ESN) value, or an International Mobile Equipment Identity (IMEI) value. A user ID is a unique value used to identify a user. Examples of user IDs include a unique alpha-numeric value, a combination of a unique alpha-numeric value and an associated password. An application ID is a unique value used to identify an application. A GUID is an example of an application ID.

In some example embodiments, the establishment of an asset sharing session is facilitated through a session request. The session request is transmitted by a device (e.g., cell phone 101) and received by an access layer device (e.g., access layer device 206). This access layer device may be a router, a wireless router, or other suitable access layer device. The session request is transmitted by the access layer device across a network (e.g., network 113) and is received by a session management server (e.g., session management server 114). The session request may use RTSP in combination with a SDP to set up an asset sharing session. The session management server generates a session ID value that the session management server transmits across the network to be received by the access layer device. This session ID value is provided to the devices 101, 102, 104, and 203. The session ID value is used by one or more of these devices to allow these devices, and/or their associated users, to participate in a session.

In some example embodiments, content is streamed during an asset sharing session. A device such as the PDA 203 may generate a content request. This content request is provided to the access layer device 206 that transmits the content request across the network 113 to be received by the session management server 114 via the distribution server 108. In some example embodiments, the content request is provided to the content server 116 in lieu of being provided to the session management server 114. The content request may include an RTSP command such as "play," or "pause." The session management server 114 may transmit a content stream across the network 113 to be received by the access layer device 206. The access layer device 206 broadcasts or unicasts the content stream to each of the devices participating in a session or context (see e.g., context 122). The content stream 202 may be transmitted by the content server 116 in lieu of being transmitted by the session management server 114. The content that makes up the content stream may be stored in the database 115. In some example embodiments, the content stream includes a referent value used to identify a particular piece of content. This referent value may later be used by one or more of the devices to access the content and to receive the content stream.

Figure 4:
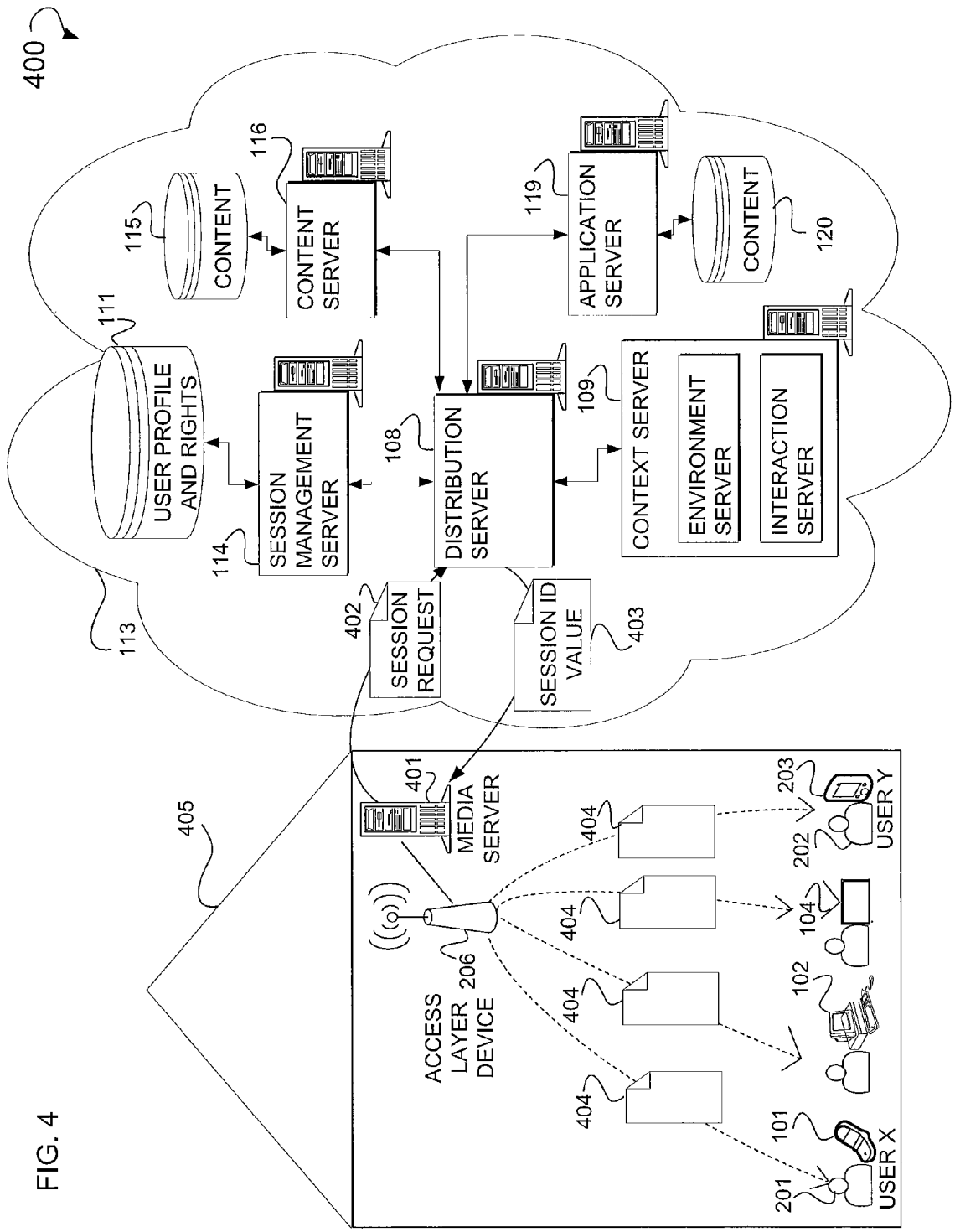
FIG. 4 is a diagram of a system, according to an example embodiment, illustrating the use of a proxy to initiate an asset sharing session.

FIG. 4 is a diagram of an example system 400 illustrating the use of a proxy to initiate an asset sharing session. Shown is a proxy in the form of a media server 401 that is operatively connected to the access layer device 206. This media server 401 generates a session request 402 that is received by the session management server 114 via the distribution server 108. The session management server 114 generates a session ID value 403 and transmits this session ID value 403 across the network 113 to be received by the media server 401. The media server 401 generates a content stream 404 that is provided to the access layer device 206 for broadcasting or unicasting to the devices 101, 102, 104, and 203. This content stream 404 includes the session ID value 403 such that the cell phone 101, computer 102, television 104, and PDA 203 may be able to utilize this session ID value 403 to re-join or otherwise re-establish a session with the session management server 114 (see e.g., FIG. 3).

Figure 5:
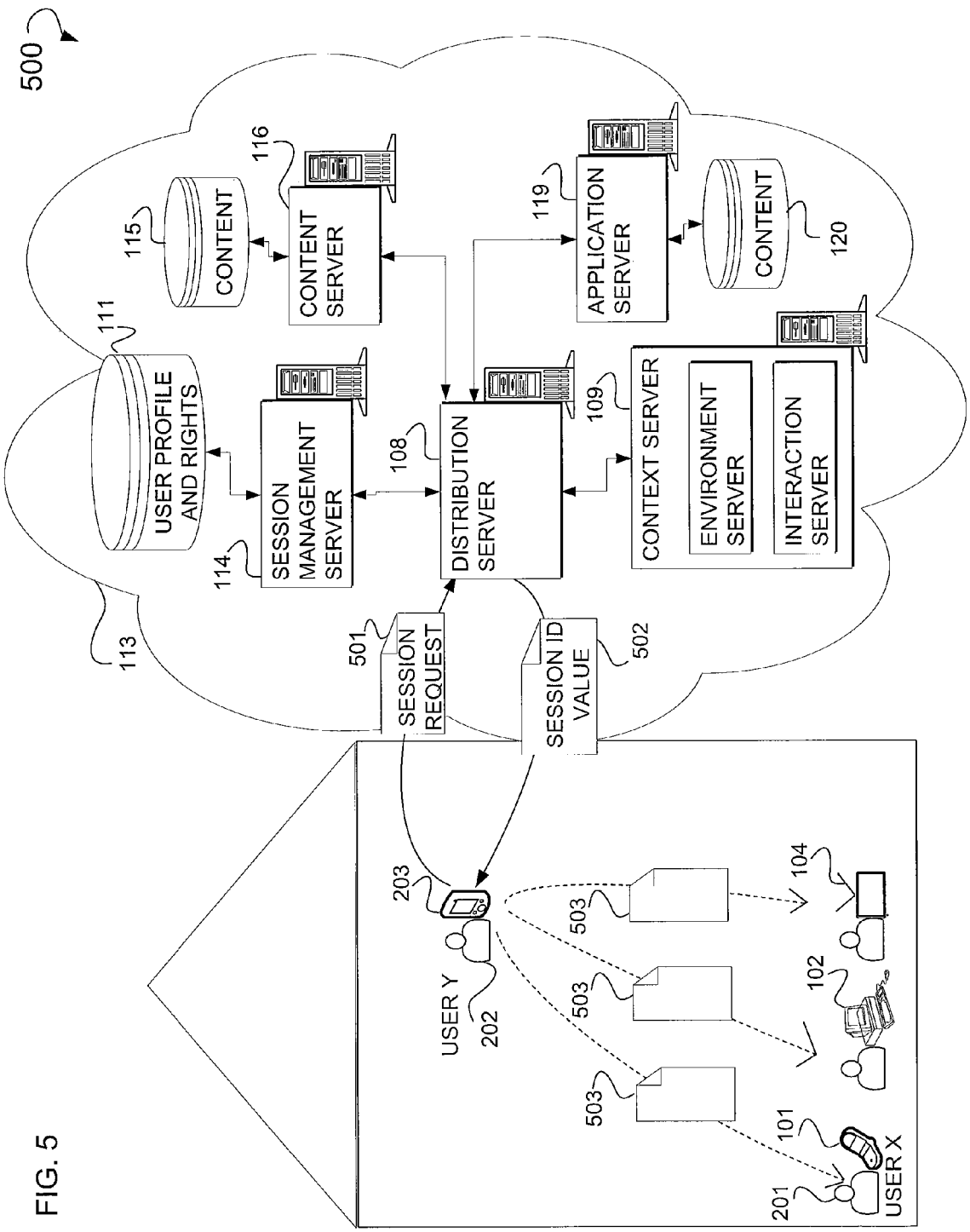
FIG. 5 is a diagram of a system, according to an example embodiment, illustrating the use of a proxy to establish an asset sharing session.

FIG. 5 is a diagram of an example system 500 illustrating the use of a proxy in the form of the PDA 203 to establish an asset sharing session. Shown is the PDA 203 that is used to establish a session via a session request 501. This session request 501 is transmitted across the network 113, and received by the session management server 114 via the distribution server 108. This session management server 114 generates a session ID value 502 and transmits this session ID value 502 across the network 113 to be received by the PDA 203. The PDA 203 broadcasts or unicasts a content stream 503 to each of the devices 102, 103 and 104 respectively. In some example embodiments, each of the content stream 503 includes the session ID value 502.

Example Logic

Figure 6:
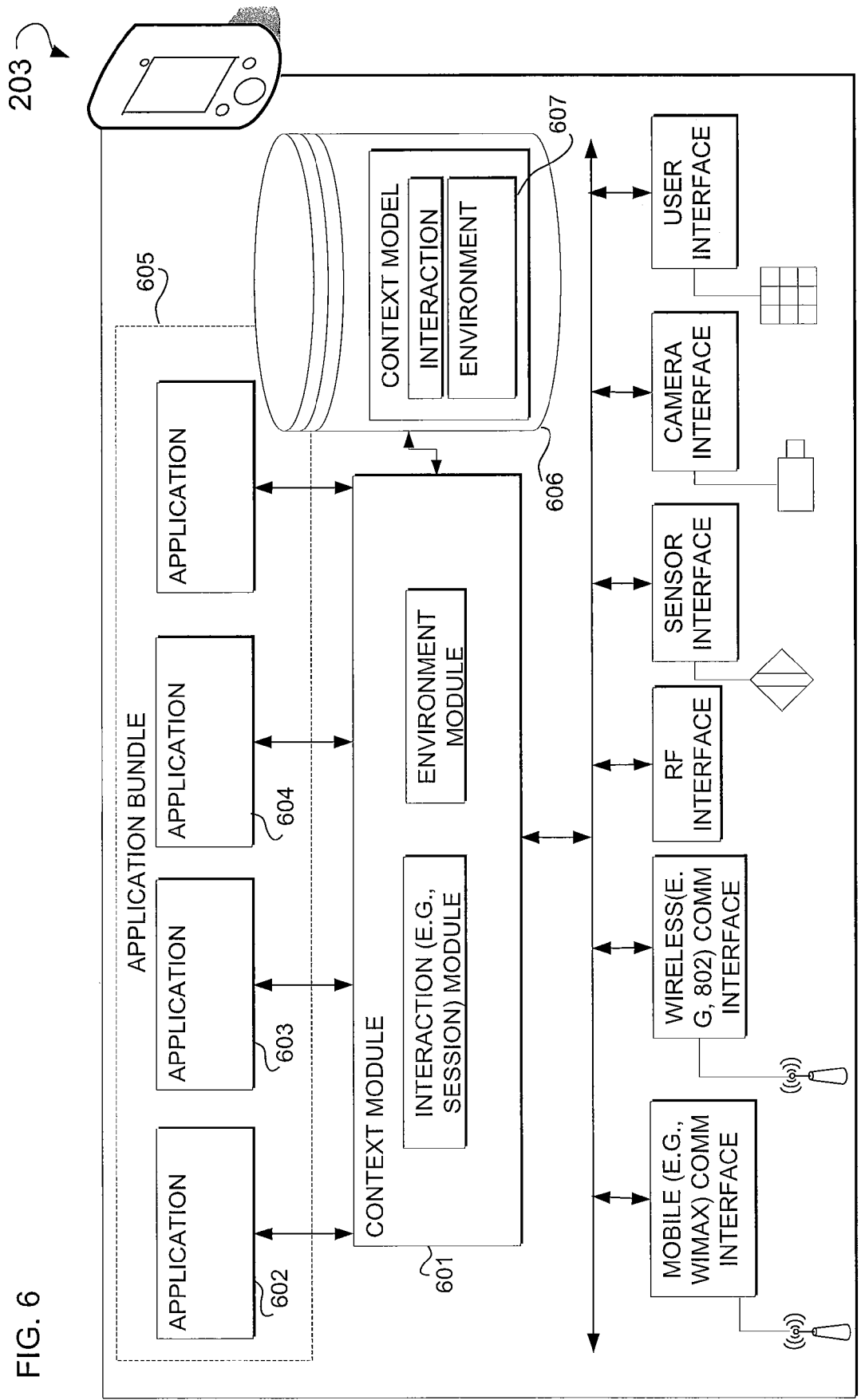
FIG. 6 is a block diagram of a Personal Digital Assistant (PDA), according to an example embodiment, that includes functionality that enables the PDA to interact with other devices in a context, environment, or session.

FIG. 6 is a block diagram of an example PDA 203 that includes functionality that enables the PDA 203 to interact with other devices in a context, environment, or session. The various blocks illustrated herein may be implemented by a computer system as hardware, firmware, or software. Additionally, these blocks may be processor-implemented blocks in the form or modules or components. Shown is a context module 601 that includes an interaction module. This interaction module may be used to establish a session in which devices may participate. Additionally, the context module may include an environment module that is used to generate the environment request 205, and to process the environment 207. Operatively connected to the context module 601 is an application bundle 605 (e.g., a suite of applications). Included in this application bundle 605 are applications 602 through 604. These applications may be used to process assets that include content and applications. Process includes, for example, display, play, record, and execute. Example applications include FLASH™ of Adobe Systems, Inc., ACROBAT™ of Adobe Systems, Inc., PHOTOSHOP™ of Adobe Systems, Inc., or some other suitable application. Additionally, operatively connected to the context module 601 is a data store 606 that includes environment data 607 as part of a context model. Included as part of this context model may be session information including a session ID, user ID, and/or device ID. Additionally, included as part of this environment data 607 is the environment 207.

Figure 7:
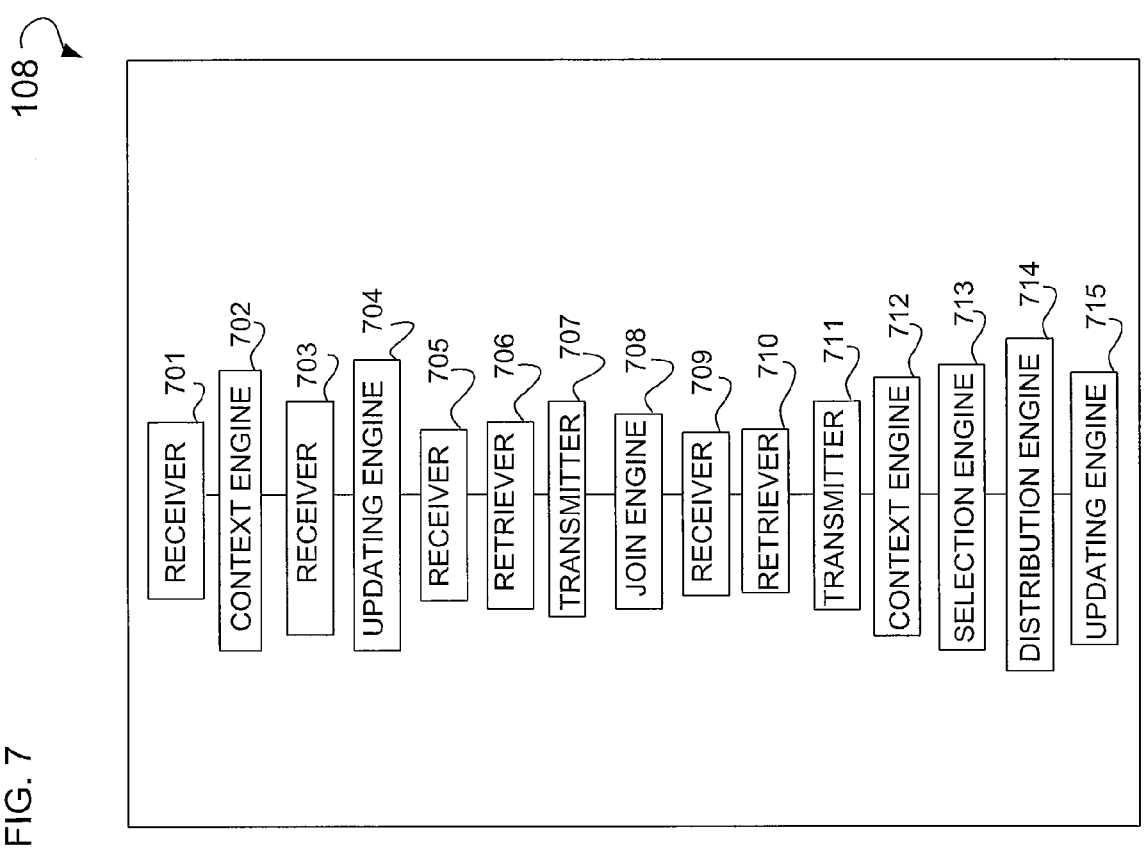
FIG. 7 is a block diagram of a computer system, according to an example embodiment, used to distribute assets based upon context.

FIG. 7 is a block diagram of an example computer system 700 used to distribute assets base upon context. The blocks shown herein may be implemented in software, firmware, or hardware. Additionally, these blocks may be processor-implemented blocks in the form or modules or components. These blocks may be directly or indirectly communicatively coupled via a physical or logical connection. The computer system 700 may be the distribution server 108, session management server 114, or some other suitable device shown in FIG. 1. Shown are blocks 701 through 715. Illustrated is a receiver 701 to receive contextual information regarding a context within which a device is operating. Communicatively coupled to the receiver 701 is a context engine 702 to provide the contextual information to an asset application that facilitates access to a plurality of assets, the contextual information to allow the asset application to interact with respective further asset applications that execute on further devices within the context. In some example embodiments, the contextual information is environmental information and identifies respective locations of the further devices. In some example embodiments, the plurality of assets comprise a plurality of applications that include at least one of a location awareness application, a smart management module application, a contextual mirroring application, a module sharing application, an interface retrieval application, a media response to social actions application, a gesture control application, or a file transfer by proxy application. In some example embodiments, the plurality of assets includes at least one of digital content, or a software application. Additionally, the plurality of assets may be stored on at least one of a network-based storage facility, or a device. Communicatively coupled to the context engine 702 is a receiver 703 to receive location data regarding the further devices. Communicatively coupled to the receiver 703 is an updating engine 704 to update the environmental information, using the location data, to reflect the respective locations of the further devices within an environment. In some example embodiments, the respective locations of the further devices within the context are determined by at least one of GPS, an IR system, or a RFID system. Communicatively coupled to the updating engine 704 is a receiver 705 to receive input to initiate a session between the device and at least one of the further devices, the session being initiated using the contextual information. Communicatively coupled to the receiver 705 is a retriever 706 to retrieve location data identifying a location of the device relative to one of the further devices. Communicatively coupled to the retriever 706 is a transmitter 707 to transmit a session request to facilitate a session between the device and one of the further devices. Communicatively coupled to the transmitter 707 is a join engine 708 to allow another device to join the session based upon a session join parameter identifying a condition to join the session, the session join parameter including at least one of an open-join parameter, a list-join parameter, or a closed-join parameter. Communicatively coupled to the join engine 708 is a receiver 709 to receive a session identifier value that identifies the session with which the device and one of the further devices is associated. In some example embodiments, the receiver 709 receives a timeline history request identifying at least one transaction engaged in by one of the further devices. Communicatively coupled to the receiver 709 is a retriever 710 to retrieve a timeline history using the session identifier value. Communicatively coupled to the retriever 710 is a transmitter 711 to transmit a timeline history dataset that includes the timeline history. In some example embodiments, the transaction includes at least one of the session request, a join request, the timeline history request, a digital content request, a session identifier transmission, a software application request, or a content stream transmission. Communicatively coupled to the transmitter 711 is a context engine 712 to provide the contextual information to a network based application distribution server (e.g., distribution server 108) to identify the further devices. Communicatively coupled to the context engine 712 is a selection engine 713 to select an asset from the plurality of assets that is appropriate to each of the further devices, the appropriateness of the asset based upon the contextual information. Communicatively coupled to the selection engine 713 is a distribution engine 714 to distribute respective versions of the asset to each of the further devices based upon a respective location of each of the further devices as provided in the contextual information. Communicatively coupled to the distribution engine 714 is an updating engine 715 to update the contextual information as to a location of one of the further devices.

Figure 8:
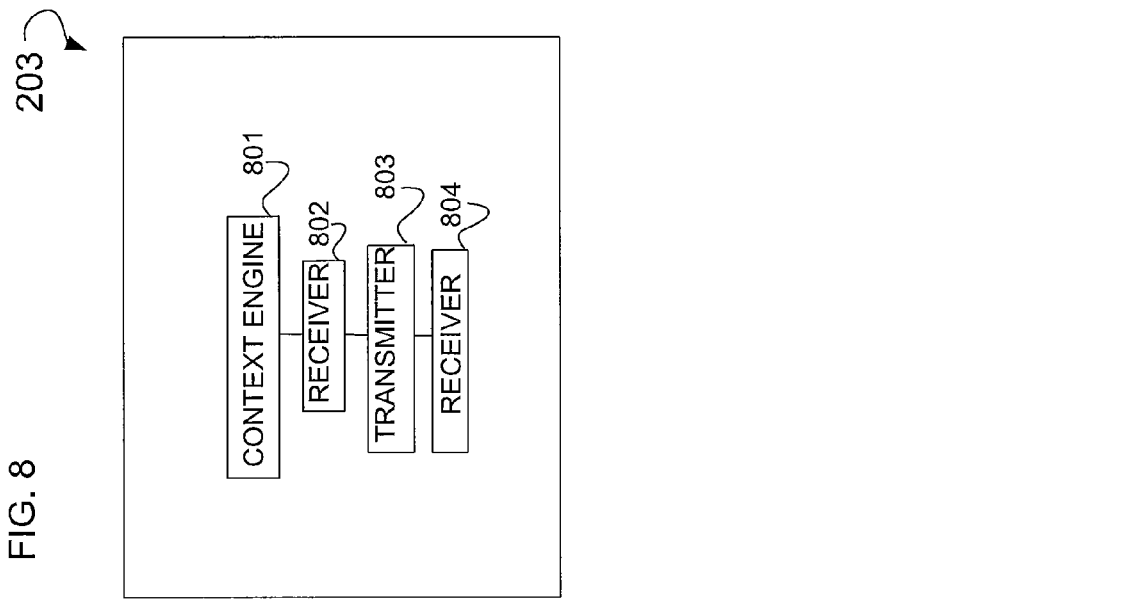
FIG. 8 is a block diagram of a computer system, according to an example embodiment, illustrating a further device used to distribute assets to a device based upon a context.

FIG. 8 is a block diagram of an example computer system 800 used to distribute assets to a device based upon a context. The blocks shown herein may be implemented in software, firmware, or hardware. Additionally, these blocks may be processor-implemented blocks in the form or modules or components. These blocks may be directly or indirectly communicatively coupled via a physical or logical connection. The computer system 800 may be the PDA 203, cell phone 101, some other suitable device shown in FIG. 1.

Shown are blocks 801 through 804. Illustrated is a context engine 801 to provide the contextual information to a client device (e.g., PDA 203) to identify the further devices (e.g., the cell phone 101, and the computer system 104). Shown is a receiver 802 (e.g., an input device) to receive input selecting an asset from the plurality of assets that is appropriate to the client device, the appropriateness of the asset based upon the contextual information. Communicatively coupled to the receiver 802 is a transmitter 803 to transmit an asset request to retrieve the asset based upon a respective location of each of the further devices as provided in the contextual information. Communicatively coupled to the transmitter 803 is a receiver 804 to receive the asset as at least one of a pointer to the asset, a content stream of the asset, or a file including the asset. In some example embodiments, the appropriateness is based upon a content right associated with at least one of the client device, or a user. A URI may be used in lieu of or in combination with the pointer to identify, retrieve, or otherwise access an asset.

FIG. 9A is a flow chart illustrating an example method 900 used to distribute an asset based upon a context. Shown are various operations 901 through 913 that may be executed on the distribution server 108, session management server 114, or additional devices shown in FIG. 1. An operation 901 is shown that is executed by the receiver 701 to receive a contextual information regarding a context within which a device is operating. An operation 902 is executed by the context engine 702 to provide the contextual information to an asset application that facilitates access to a plurality of assets, the contextual information to allow the asset application to interact with respective further asset applications executing on further devices within the context. In some example embodiments, the contextual information is environmental information and identifies respective locations of the further devices. Further, in some example embodiments, the plurality of assets comprise a plurality of applications that include at least one of a location awareness application, a smart management module application, a contextual mirroring application, a module sharing application, an interface retrieval application, a media response to social actions application, a gesture control application, or a file transfer by proxy application. In some example embodiments, the plurality of assets includes at least one of digital content, or a software application. Additionally, in some example embodiments, the plurality of assets is stored on at least one of a network-based storage facility, or a device. An operation 903 is executed by the receiver 703 to receive location data regarding the further devices. An operation 904 is executed by the updating engine 704 to update the environmental information, using the location data, to reflect the respective locations of the further devices within an environment. In some example embodiments, the respective locations of the further devices within the context are determined by at least one of a GPS, an IR system, or a RFID system.

In some example embodiments, operation 905 is executed by the receiver 705 to receive input to initiate a session between the device and at least one of the further devices, the session being initiated using the contextual information. Operation 906 is executed by the retriever 706 to retrieve location data identifying a location of the device relative to one of the further devices. Operation 907 is executed by the transmitter 707 to transmit a session request to facilitate a session between the device and one of the further devices. Operation 908 is executed by the join engine 708 to allow another device to join the session based upon a session join parameter identifying a condition to join the session, the session join parameter including at least one of an open-join parameter, a list-join parameter, or a closed-join parameter. Operation 909 is executed by the receiver 709 to receive a session identifier value that identifies the session with which the device and one of the further devices is associated. Operation 910 is executed by the receiver 709 to receive a timeline history request identifying at least one transaction engaged in by one of the further devices. Operation 911 is executed by the retriever 910 to retrieve a timeline history using the session identifier value. Operation 912 is executed by the transmitter 711 to transmit a timeline history dataset that includes the timeline history. In some example embodiments, a transaction includes at least one of the session request, a join request, the timeline history request, a digital content request, a session identifier transmission, a software application request, or a content stream transmission. Operation 913 is executed by the context engine 712 to provide the contextual information to a network based application distribution server to identify the further devices.

Figure 9B:
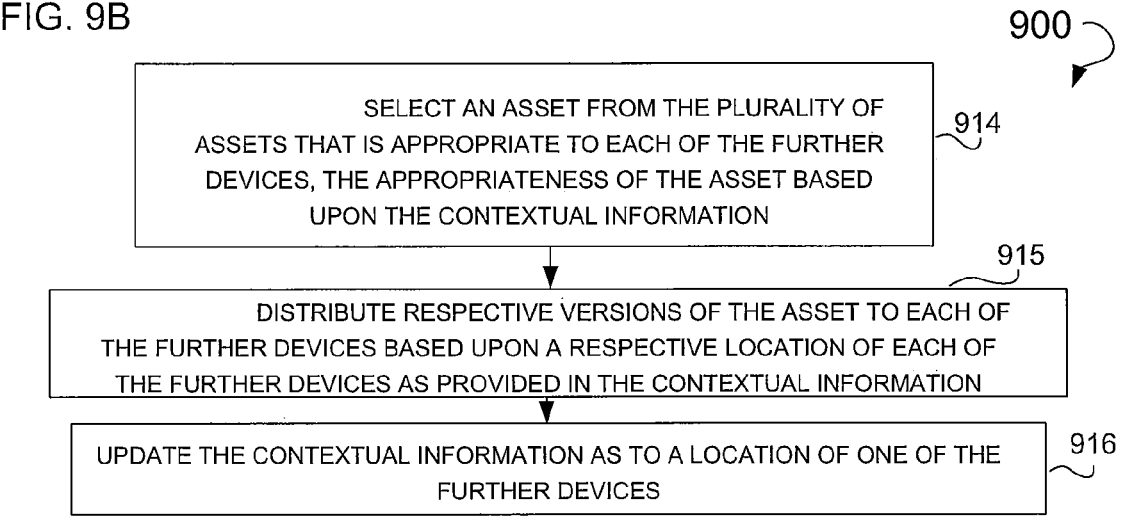
FIG. 9B is a further flow chart further illustrating the method, according to an example embodiment, used to distribute an asset based upon a context.

FIG. 9B is a further flow chart illustrating the example method 900 used to distribute an asset based upon a context. An operation 914 is executed by the network based application distribution server (e.g., the distribution server 108), and the selection engine 713 associated therewith, to select an asset from the plurality of assets that is appropriate to each of the further devices, the appropriateness of the asset based upon the contextual information. Operation 915 is executed by the distribution engine 714 to distribute respective versions of the asset to each of the further devices based upon a respective location of each of the further devices as provided in the contextual information. Operation 916 is executed by the updating engine 715 to update the contextual information as to a location of one of the further devices.

Figure 10:
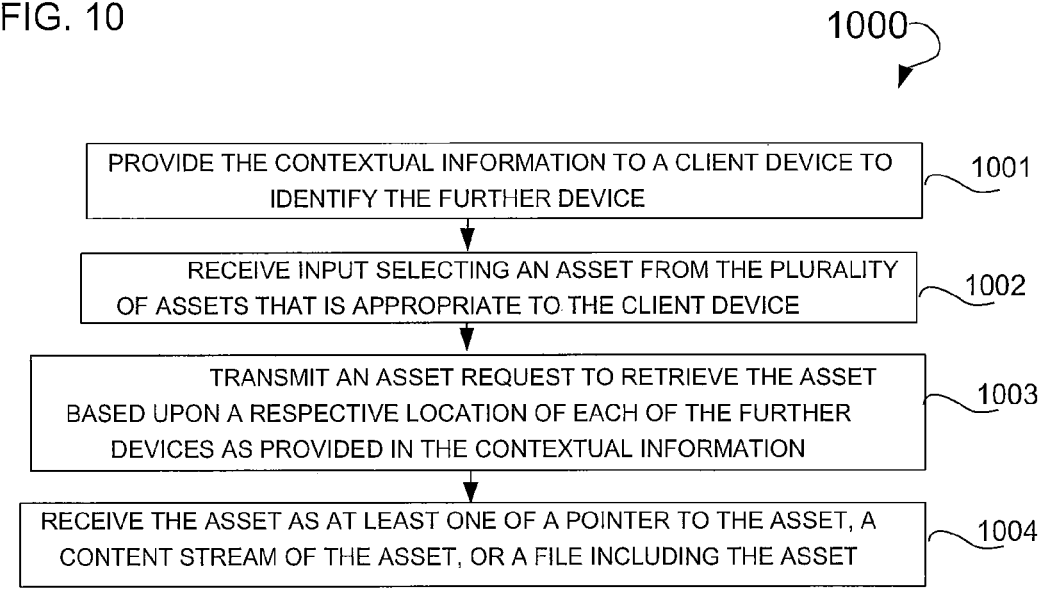
FIG. 10 is a flow chart illustrating a method, according to an example embodiment, used to distribute an asset to a client based upon a context.

FIG. 10 is a flow chart illustrating an example method 1000 used to distribute an asset to a client based upon a context. Shown are various operations 1001 through 1004 that may be executed on the PDA 203 shown in FIG. 2. Operation 1001 is executed by the context engine 801 to provide the contextual information to a client device to identify the further devices. Operation 1002 is executed by the receiver 802 to receive input selecting an asset from the plurality of assets that is appropriate to the client device, the appropriateness of the asset based upon the contextual information. Operation 1003 is executed by the transmitter 803 to transmit an asset request to retrieve the asset based upon a respective location of each of the further devices as provided in the contextual information. Operation 1004 is executed by the receiver 803 to receive the asset as at least one of a pointer to the asset, a content stream of the asset, or a file including the asset. In some example embodiments, the appropriateness is based upon a content right associated with at least one of the client device, or a user. A URI may be used in lieu of or in combination with the pointer to identify, retrieve, or otherwise access an asset.

Figure 11:
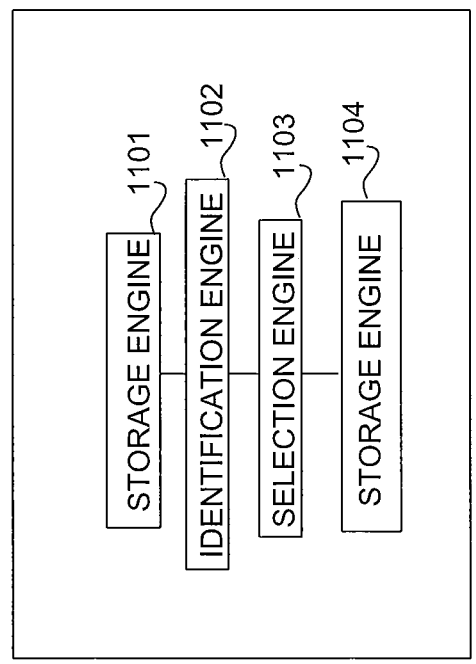
FIG. 11 is a block diagram of a computer system, according to an example embodiment, used to manage an asset sharing session between active and inactive devices.

FIG. 11 is a block diagram of an example computer system 1100 used to manage an asset sharing session between active and inactive devices. The blocks shown herein may be implemented in software, firmware, or hardware. Additionally, these blocks may be processor-implemented blocks in the form or modules or components. These blocks may be directly or indirectly communicatively coupled via a physical or logical connection. The computer system 1100 may be the session management server 114 shown in FIG. 1. Shown are blocks 1101 through 1104. Illustrated is a storage engine 1101 to store device information that identifies a first plurality of devices associated with a first user. Communicatively coupled to the storage engine 1101 is an identification engine 1102 to identify a first device of the first plurality of devices as being active. Communicatively coupled to the identification engine 1102 is a selection engine 1103 to selectively provide data that pertains to an interaction session, within which the first user is a participant, to the first device based on the determination that the first device is active. In some example embodiments, the interaction session is between at least one device of the first plurality of devices associated with the first user, and at least one device of a second plurality of devices associated with a second user. In some example embodiments, the selection engine 1103 is used to provide the data that pertains to the interaction session and includes providing state information to the first device so as to migrate a state of the interaction session between the first device and a further device associated with the first user. This state information includes whether the state is an active state, inactive state, steady state, standby state, or some other suitable state.

In some example embodiments, communicatively coupled to the selection engine 1103 is an additional storage engine 1104 to store a plurality of assets to be network-accessible by the first plurality of network devices, and wherein the providing of the data that pertains to the interaction session includes providing an asset of the plurality of assets to the first device. In some example embodiments, the asset includes at least one of an application or a content. In some example embodiments, the selection engine 1103 is used to selectively provide the data that pertains to the interaction session includes providing notifications that pertain to the interaction session to first device. Additionally, the identification engine 1102 is used to identify the first device as being active and facilitating the establishment of a plurality of connections with the plurality of devices respectively, and receiving activity information from the plurality of devices via the plurality of connections. In some example embodiments, the selection engine 1103 provides for a selection of the data and includes a customization of the data for the first device to which the data pertaining to the interaction session is provided. Further, the selection engine 1103 may provide for the data to include a customization of the data according to user profile information for the first user. In some example embodiments, the user profile information includes a user preference information. Additionally, in some example embodiments, the identification engine 1102 includes an identifying the first device as active and includes at least one of receiving input through an input device, or receiving input through an accelerometer.

Figure 12:
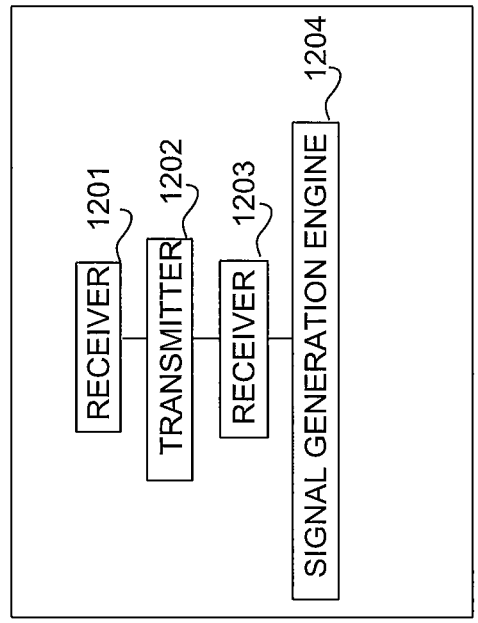
FIG. 12 is a block diagram of a computer system, according to an example embodiment, used to initiate an asset sharing session participated in by active and inactive devices.

FIG. 12 is a block diagram of an example computer system 1200 used to initiate an asset sharing session participated in by active and inactive devices. The blocks shown herein may be implemented in software, firmware, or hardware. Additionally, these blocks may be processor-implemented blocks in the form or modules or components. These blocks may be directly or indirectly communicatively coupled via a physical or logical connection. The computer system 1200 may be the PDA 203, cell phone 101, computer 102, or some other suitable device shown in FIG. 2. Shown are blocks 1201 through 1204. Illustrated is a receiver 1201 to receive input indicative of a user location associated with a first device, the first device participating in an asset sharing session that includes the first device and a second device. Communicatively coupled to the receiver 1201 is a transmitter 1202 to transmit an active device signal based upon the input indicative of the user location. Communicatively coupled to the transmitter 1202 is a receiver 1203 to receive an asset at the first device based upon the active device signal. In some example embodiments, the second device is inactive. Communicatively coupled to the receiver 1203 is a signal generation engine 1204 to generate the active device signal based upon at least one of receiving input through an input device, or receiving input through an accelerometer.

Figure 13:
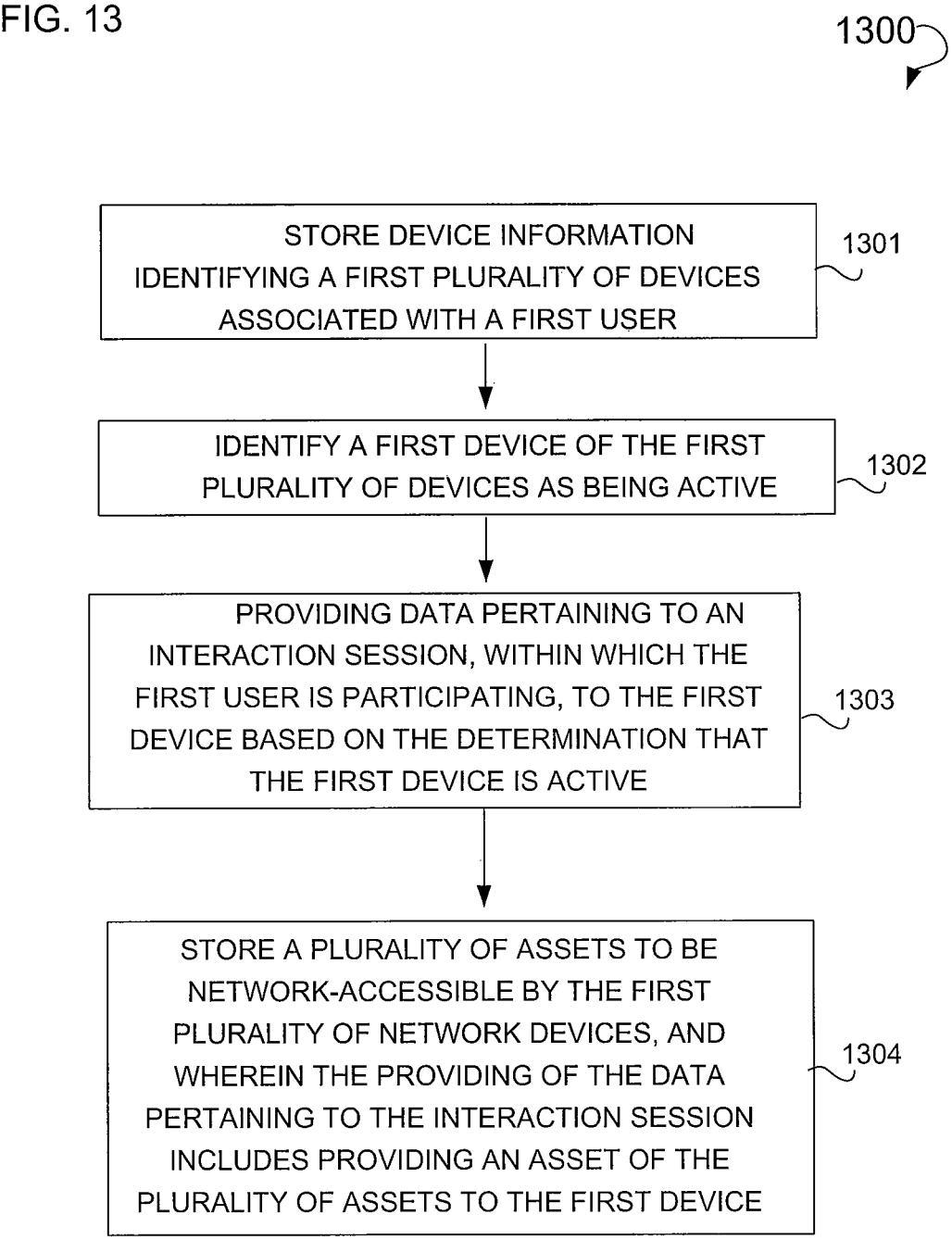
FIG. 13 is a flow chart illustrating a method, according to an example embodiment, used to manage an asset sharing session between active and inactive devices.

FIG. 13 is a flow chart illustrating an example method 1300 used to manage an asset sharing session between active and inactive devices. Shown are various operations 1301 through 1304 that may be executed on the session management server 114 shown in FIG. 1. Operation 1301 is executed by the storage engine 1101 to store device information identifying a first plurality of devices associated with a first user. Operation 1302 is executed by the identification engine 1102 to identify a first device of the first plurality of devices as being active. Operation 1303 is executed by the selection engine 1103 to selectively provide data pertaining to an interaction session, within which the first user is participating, to the first device based on the determination that the first device is active. In some example embodiments, the interaction session is between at least one device of the first plurality of devices associated with the first user, and at least one device of a second plurality of devices associated with a second user. In some example embodiments, the providing of the data pertaining to the interaction session includes providing state information to the first device so as to migrate a state of the interaction session between the first device and a further device associated with the first user. This state information includes whether the state is an active state, inactive state, steady state, standby state, or some other suitable state.

In some example embodiments, operation 1304 is executed by the storage engine 1104 to store a plurality of assets to be network-accessible by the first plurality of network devices, and wherein the providing of the data pertaining to the interaction session includes providing an asset of the plurality of assets to the first device. In some example embodiments, the asset includes at least one of an application or a content. In some example embodiments, the providing of the data pertaining to the interaction session includes providing notifications pertaining to the interaction session to first device. In some example embodiments, the identifying of the first device as being active includes establishing a plurality of connections with the plurality of devices respectively, and receiving activity information from the plurality of devices via the plurality of connections. In some example embodiments, the providing of the data includes customizing the data for the first device to which the data pertaining to the interaction session is provided. In some example embodiments, the providing of the data includes customizing the data according to user profile information for the first user. The user profile information includes a user preference information. In some example embodiments, the identification of the first device as active includes at least one of receiving input through an input device, or receiving input through an accelerometer.

Figure 14:
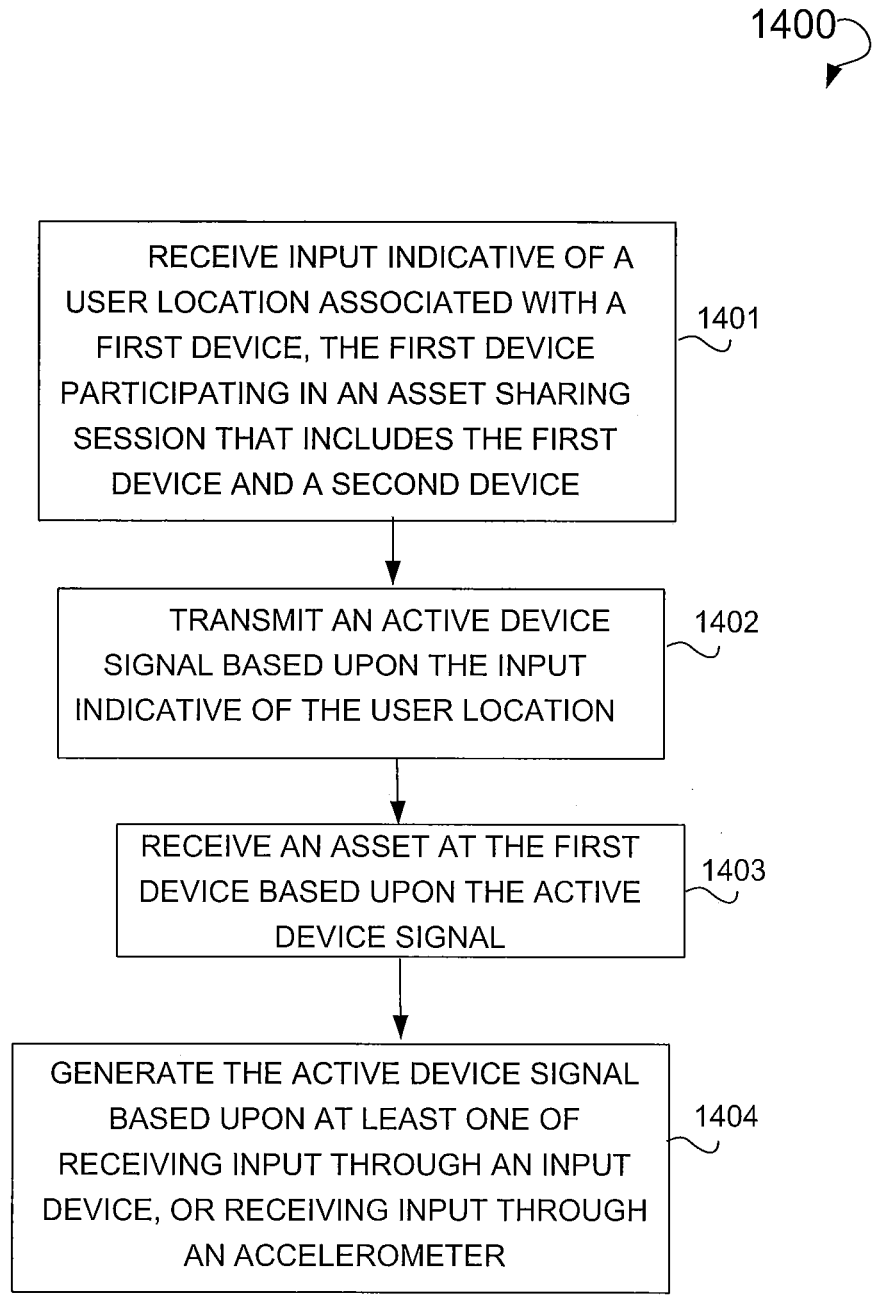
FIG. 14 is a flow chart illustrating a method, according to an example embodiment, used to initiate an asset sharing session participated in by active and inactive devices.

FIG. 14 is a flow chart illustrating an example method 1400 used to initiate an asset sharing session participated in by active and inactive devices. Shown are various operations 1401 through 1404 that may be executed on the devices (e.g., 101, 102, 104) shown in FIG. 1. Operation 1401 is executed by the receiver 1201 to receive input indicative of a user location associated with a first device, the first device participating in an asset sharing session that includes the first device and a second device. Operation 1402 is executed by the transmitter 1202 to transmit an active device signal based upon the input indicative of the user location. Operation 1403 is executed by the receiver 1203 to receive an asset at the first device based upon the active device signal. In some example embodiments, the second device is inactive. Operation 1404 is executed by the signal generation engine 1204 to generating the active device signal based upon at least one of receiving input through an input device, or receiving input through an accelerometer.

In some example embodiments, a method is used to initiate an asset sharing session participated in by active and inactive devices. This method includes the following operations, and may be executed by the devices (e.g., 101, 102, 104) shown in FIG. 1. Shown is an operation that executes instructions on a computing platform so that binary digital electronic signals representing device information identifying a first plurality of devices associated with a first user are stored in a memory location of the computing platform. Additionally, an operation executes instructions on the computing platform so that a first device of the first plurality of devices is identified as being active. Further, an operation executes instructions on the computing platform so that binary digital electronic signals representing data are provided pertaining to an interaction session within which the first user is participating to the first device based on the determination that the first device is active.

Figure 15:
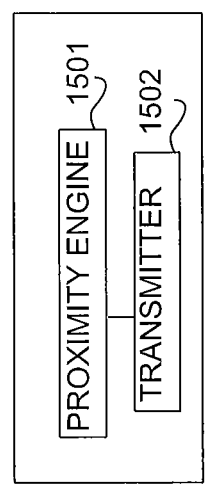
FIG. 15 is a block diagram of a computer system, according to an example embodiment, used to identify a device serving as a proxy, where the device is associated with a physical structure.

FIG. 15 is a block diagram of an example computer system 1500 used to identify a device serving as a proxy, where the device is associated with a physical structure. The blocks shown herein may be implemented in software, firmware, or hardware. Additionally, these blocks may be processor-implemented blocks in the form or modules or components. These blocks may be directly or indirectly communicatively coupled via a physical or logical connection. The computer system 1500 may be the PDA 203 shown in FIG. 2. Shown are blocks 1501 through 1502. Illustrated is a proximity engine 1501 to determine that a network device is within a determinable proximity of a physical structure. Communicatively coupled to the proximity engine 1501 is a transmitter 1502 to selectively provide data that pertains to an interaction session to the network device, via a network, based on the determination, the interaction session being between a plurality of network devices within the determinable proximity of the physical structure. In some example embodiments, the determination comprises a determination that the portable network device is within communication range of a further network device that is associated with the physical structure.

In some example embodiments, the determination comprises a determination of a geographic location of the network device, and comparing the geographic location of the network device with a geographic location of the physical structure. In some example embodiments, the determination of the geographic location of the network device is performed through the use of at least one of information determined by the network device, or information determined by a further device. Additionally, in some example embodiments, the interaction session is between a pluralities of network devices respectively associated with a plurality of users, each of the plurality of network devices being within the determinable proximity of the physical structure. In some example embodiments, the data that pertains to the interaction session is related to an activity associated with the physical structure. In some example embodiments, the physical structure is a building, and the activity associated with the physical structure is a service provided within the building. In some example embodiments, the determination of the network device is within the determinable proximity includes determining that the network device is located within the physical structure. Further, in some example embodiments, the data that pertains to the interaction session includes at least one of an application or content. In some example embodiments, the network device is handheld.

Figure 16:
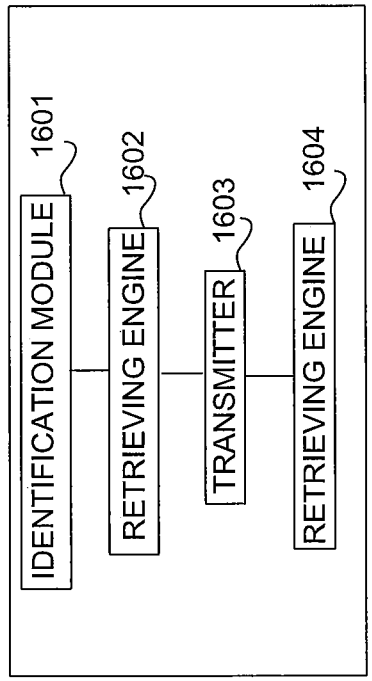
FIG. 16 is a block diagram of a computer system, according to an example embodiment, used to retrieve content for a content sharing session involving the use of a device serving as a proxy.

FIG. 16 is a block diagram of an example computer system 1600 used to retrieve content for a content sharing session involving the use of a device serving as a proxy. The blocks shown herein may be implemented in software, firmware, or hardware. Additionally, these blocks may be processor-implemented blocks in the form or modules or components. These blocks may be directly or indirectly communicatively coupled via a physical or logical connection. The computer system 1600 may be the distribution server 108, session management server 114, or one of the other server shown in FIG. 2. Shown are blocks 1601 through 1604. Illustrated is an identification module 1601 to identify a device proximate to another device associated with a physical structure, the device participating in a content sharing session to share content based upon a content right. Communicatively coupled to the identification module 1601 is a retrieving engine 1602 to retrieve the content based upon the content right associated with the device. Communicatively coupled to the retrieving engine 1602 is a transmitter 1603 to transmit the content to the device participating in the session. In some example embodiments, the device associated with a physical structure is a proxy device that initiates a content sharing session on behalf of the device. Communicatively coupled to the transmitter 1603 is a retrieving engine 1604 to retrieve the content based upon the content right associated with a user identifier.

FIG. 17 is a flow chart illustrating an example method 1300 used to identify a device serving as a proxy, where the device is associated with a physical structure. Shown are various operations 1701 through 1702 that may be executed on the PDA 203 shown in FIG. 2. Operation 1701 is executed by the proximity engine 1501 to determine that a network device is within a determinable proximity of a physical structure. Operation 1702 is executed by the transmitter 1502 to providing data pertaining to an interaction session to the network device, via a network, based on the determination, the interaction session being between a pluralities of network devices within the determinable proximity of the physical structure. In some example embodiments, the determination comprises determining that the portable network device is within communication range of a further network device that is associated with the physical structure. In some example embodiments, the determination comprises determining a geographic location of the network device, and comparing the geographic location of the network device with a geographic location of the physical structure. In some example embodiments, the determining of the geographic location of the network device is performed using at least one of information determined by the network device, or information determined by a further device. In some example embodiments, the interaction session is between a plurality of network devices respectively associated with a plurality of users, each of the plurality of network devices being within the determinable proximity of the physical structure. Additionally, in some example embodiments, data pertaining to the interaction session is related to an activity associated with the physical structure. In some example embodiments, the physical structure is a building, and the activity associated with the physical structure is a service provided within the building. In some example embodiments, the determination includes determining that the network device is located within the physical structure.

Further, in some example embodiments, the data pertaining to the interaction session includes at least one of an application or content.

Figure 18:
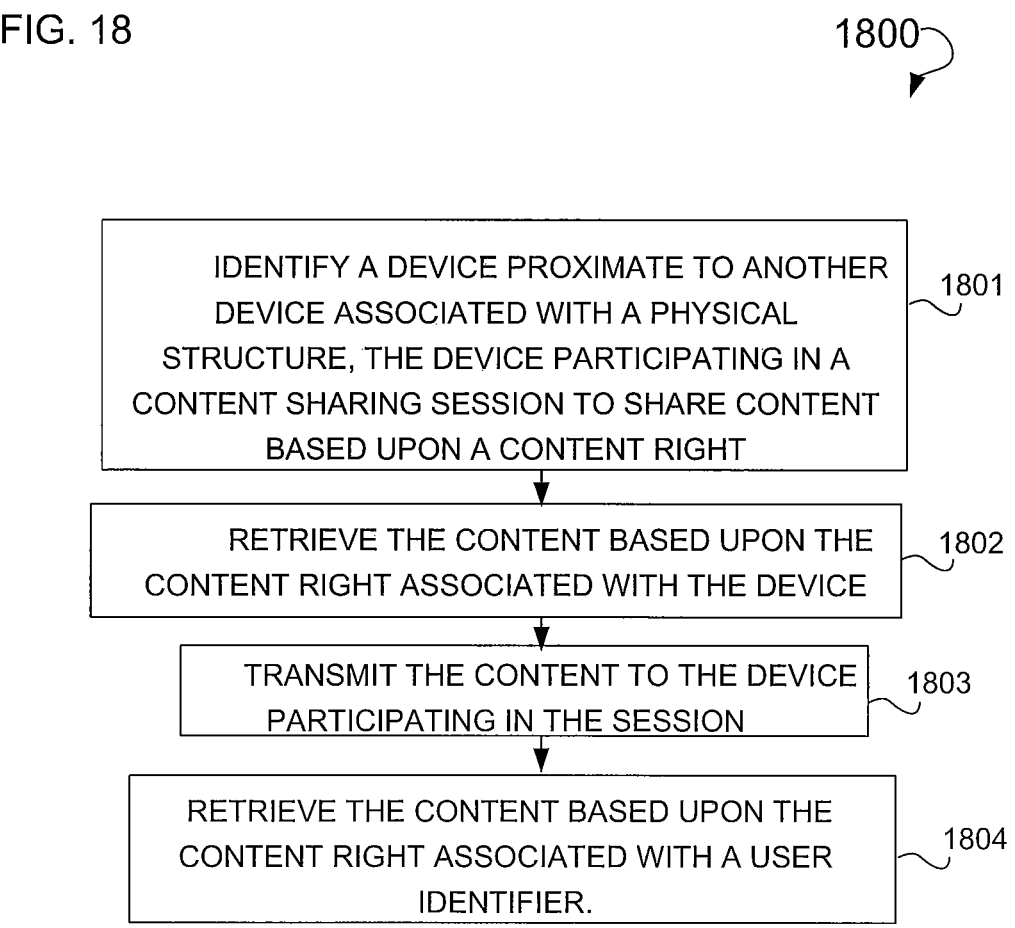
FIG. 18 is a flow chart illustrating a method, according to an example embodiment, used to retrieve an asset for a sharing within a context that includes the use of a device serving as a proxy.

FIG. 18 is a flow chart illustrating an example method 1800 used to retrieve an asset for a sharing within a context that includes the use of a device serving as a proxy. Shown are various operations 1801 through 1805 that may be executed on the distribution server 108, session management server 114, or some other suitable device illustrated in FIG. 1. An operation 1801 is shown that is executed by the identification module 1601 to identify a device proximate to another device associated with a physical structure, the device participating in a content sharing session to share content based upon a content right. Operation 1802 is executed by the retrieving engine 1602 to retrieve the content based upon the content right associated with the device. Operation 1803 is executed by the transmitter 1603 to transmit the content to the device participating in the session. In some example embodiments, the device associated with a physical structure is a proxy device that initiates a content sharing session on behalf of the device. Operation 1804 is executed by the retrieving engine 1604 to retrieve the content based upon the content right associated with a user identifier.

Figure 19:
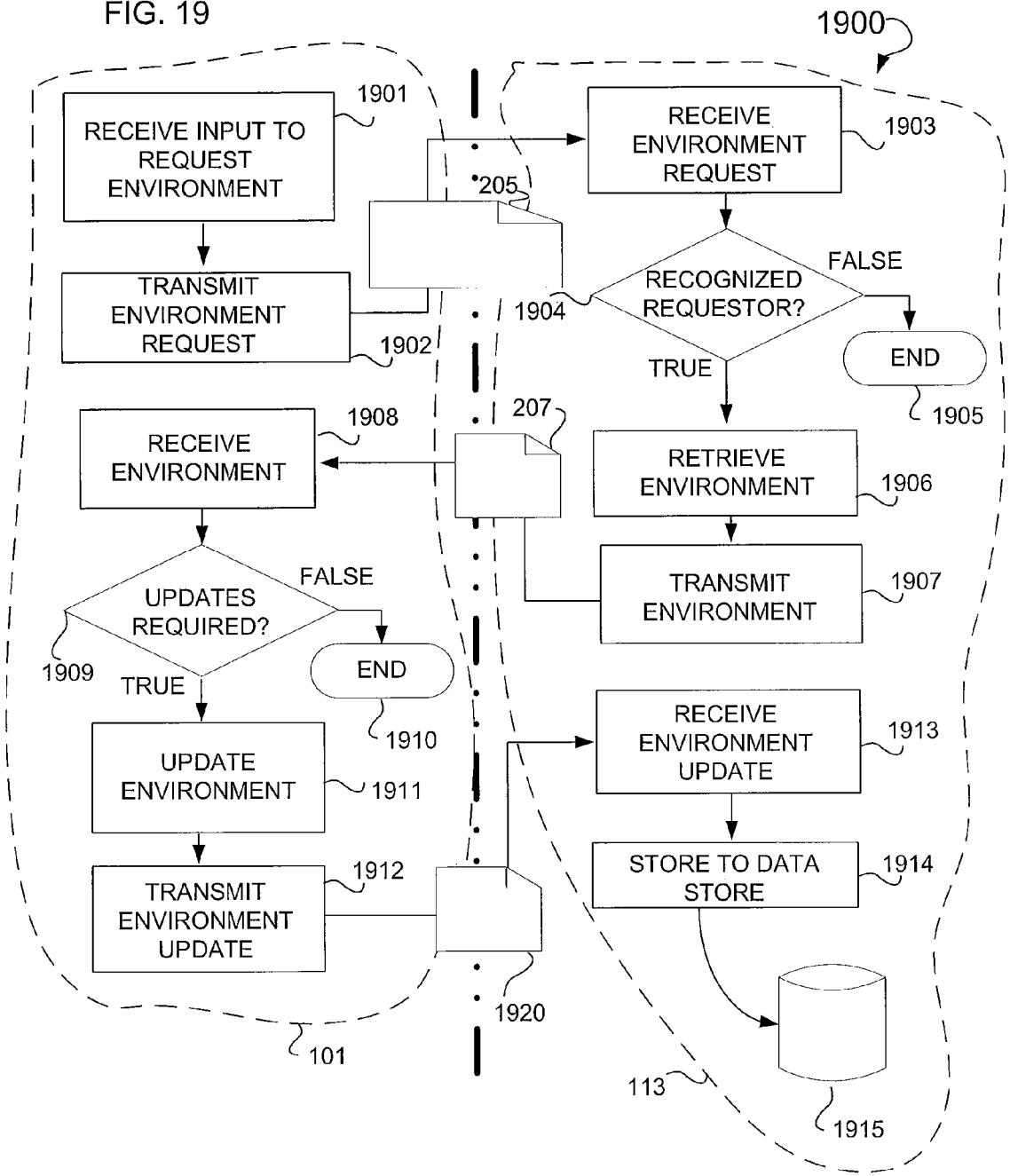
FIG. 19 is a dual-stream flow chart illustrating a method, according to an example embodiment, used to request and receive an environment, and to generate an environment update.

FIG. 19 is a dual-stream flow chart illustrating an example method 1900 used to request and receive an environment, and to generate an environment update. Shown are operations 1901 through 1902, and 1908 through 1912. These various operations may be executed by the cell phone 101, or other suitable device that interacts in a context. Also shown are operations 1903 through 1907, and 1913 through 1914. These various operations are executed with the network 113 and the various servers (e.g., 108, 114, 109, and 116) illustrated therein. For example, the distribution server 108 may execute these various operations 1903 through 1907, and 1913 through 1914. Shown is an operation 1901 that, when executed, receives input to request an environment. This input may be generated by an input device such as a touch screen, mouse, keyboard, light pen, or other suitable input device. Operation 1902 is executed to transmit the environment request 205. Operation 1903, when executed, receives the environment request. Decisional operation 1904 is executed to determine whether the device, and user associated therewith, is recognized as being able to request an environment. Where decisional operation 1904 evaluates to "false," a termination condition 1905 is executed as the requesting device or user is unrecognized. In case where decisional operation 1904 evaluates to "true," an operation 1906 is executed. Operation 1906, when executed, retrieves an environment from, for example, the context server 109 and data store associated therewith (not pictured). Operation 1907 is executed to transmit the environment 207. Operation 1908 is executed to receive the environment 207. In some example embodiments, the operation 1908 is executed by one of more of the interfaces shown in FIG. 6. A decisional operation 1909 is executed to determine whether an update of the environment 207 is required. In cases where decisional operation 1909 evaluates to "false," a termination condition 1901 is executed. In cases where decisional operation 1909 evaluates to "true," an operation 1911 is executed. Operation 1911 is executed to update the environment 207. This update may include additional location information relating to the cell phone 101, or other device participating in the context 122. Operation 1912 is executed to transmit an environment update 1920. This environment update 1920 is received through the execution of operation 1913. Operation 1914 is executed to store the environment update 1920 into a data store 1915.

Figure 20:
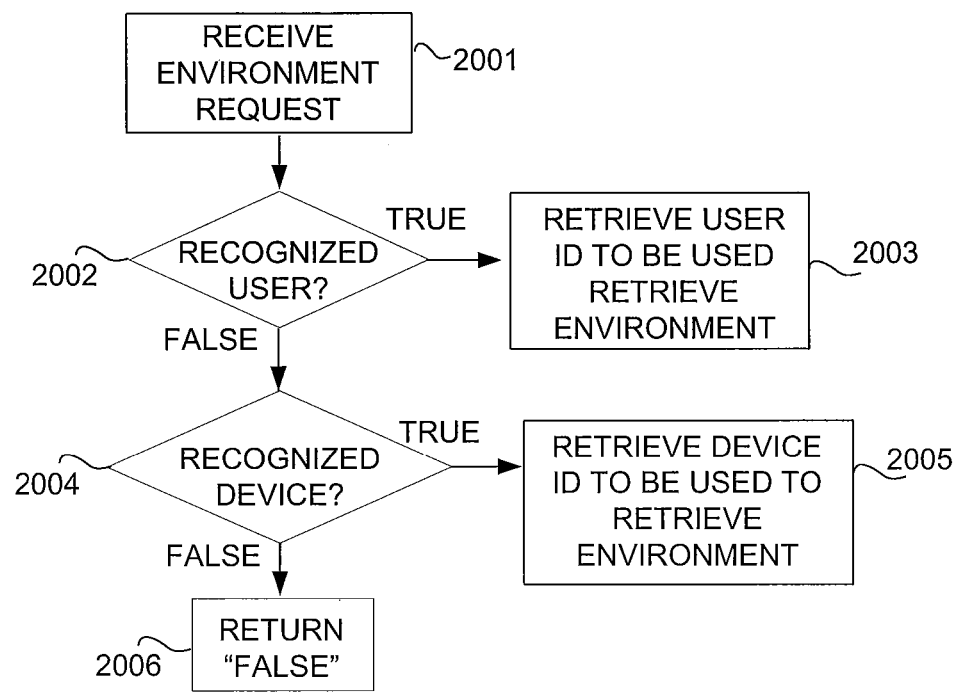
FIG. 20 is a flow chart illustrating an operation, according to an example embodiment, that receives an environment request.

FIG. 20 is a flow chart illustrating an example execution of operation 1903. Shown is an operation 2001 that is executed to receive the environment request 205. A decisional operation 2002 is shown that, when executed, determines whether a user is recognized. In cases where decisional operation 2002 evaluates to "true," a operation 2003 is executed. Operation 2003 is executed to retrieve a user ID to be used to retrieve an environment. In cases where decisional operation 2002 evaluates to "false," an further decisional operation 2004 is executed. Decisional operation 2004 is executed to determine whether a device making the environment request 205 is recognized. In cases where decisional operation 2004 evaluates to "true," an operation 2005 is executed. Operation 2005 is executed to retrieve a device ID to be used to retrieve an environment. In cases decisional operation 2004 evaluates to "false," operation 2006 returns a "false" value.

Figure 21:
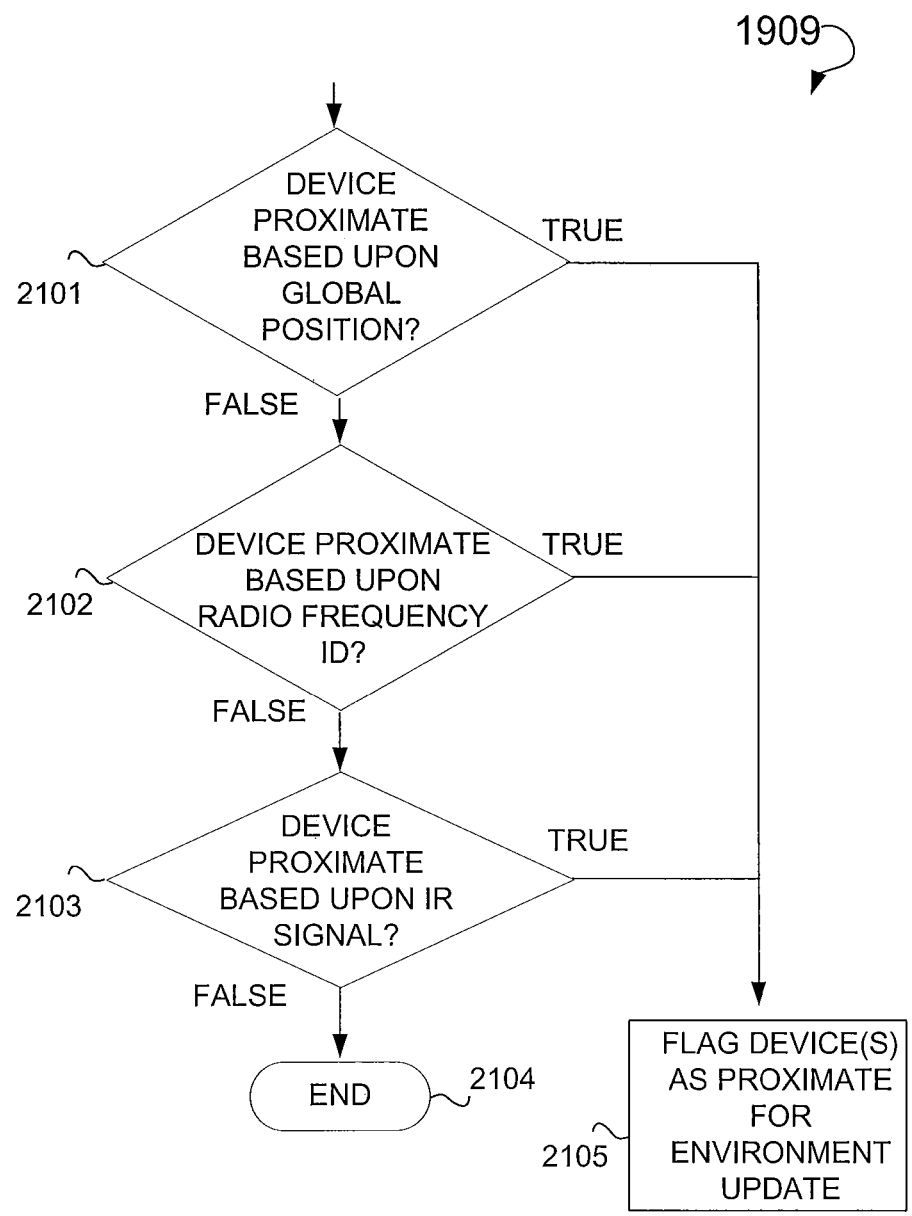
FIG. 21 is a flow chart illustrating an operation, according to an example embodiment, to determine whether an update of the environment is required.

FIG. 21 is a flow chart illustrating an example execution of an example operation 1909. Shown is a decisional operation 2101 that determines whether a device is proximate based upon a global position as denoted through the use of a GPS. In cases where decisional operation 2101 evaluates to "true," an operation 2105 is executed. In cases where decisional operation 2101 evaluates to "false," a decisional operation 2102 is executed. Operation 2102, when executed, determines device proximity based upon a RFID. In cases where decisional operation 2102 evaluates to "true," the operation 2105 is executed. In cases where decisional operation 2102 evaluates to "false," a further decisional operation 2103 is executed. Operation 2103 is executed to determine whether a device is proximate based upon an IR signal. In cases where decisional operation 2103 evaluates to "true," the operation 2105 is executed. In cases where decisional operation 2103 evaluates to "false," a determination condition 2104 is executed or otherwise implemented. Operation 2105, when executed, flags (e.g., sets a boolean value representing the device) a device as proximate for the purposes of updating an environment.

Figure 22:
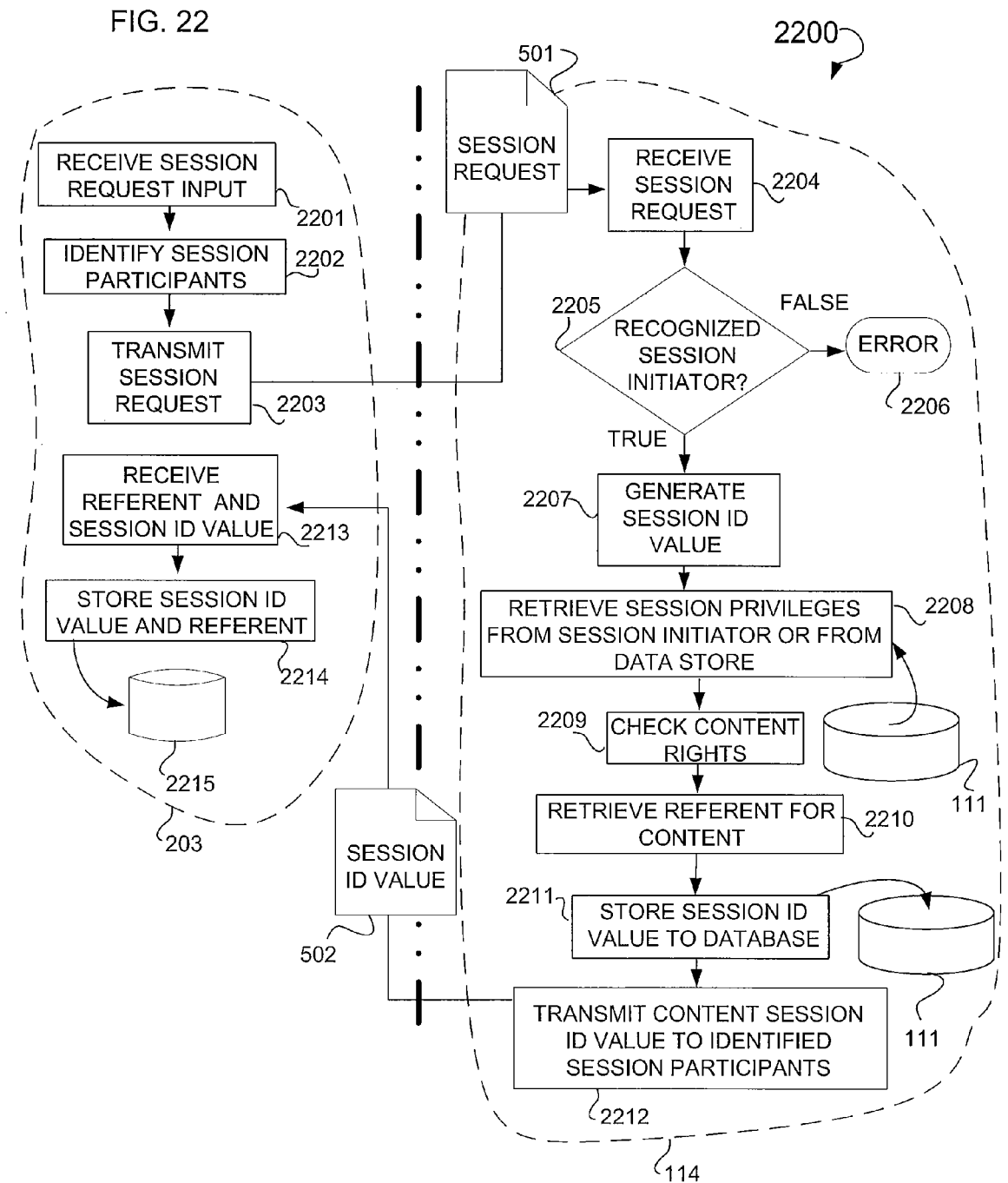
FIG. 22 is a dual-stream flow chart illustrating a method, according to an example embodiment, used for the establishment of an asset sharing session.

FIG. 22 is a dual-stream flow chart illustrating a method 2200 used for the establishment of an asset sharing session. Shown are various operations 2201 through 2203, and 2213 through 2214 that are executed by the PDA 203. Further shown are various operations 2204 through 2212 that are executed by the session management server 114. Illustrated is an operation 2201 that when executed receives a session request input. This input may be generated through the use of a mouse, light pen, touch screen, keyboard, or other suitable input device. An operation 2202 is executed to identify session participants. These session participants may be the cell phone 101, computer 102, or PDA 203, and/or the users associated therewith. An operation 2203 is executed to transmit the session request 501 across the network 113. An operation 2204 is executed to receive this session request 501. A decisional operation 2205 is executed to determine whether the session initiator (e.g., the device or person as identified via a device ID, and/or user ID) may establish a session. In cases where decisional operation 2205 evaluates to "false," an error condition 2206 is noted. In cases where decisional operation 2205 evaluates to "true," an operation 2207 is executed that generates a session ID value. Operation 2208 is executed to retrieve session privileges from the session initiator (e.g., the cell phone 101 and/or the associated user), or from the database 115. An operation 2209 is executed that checks the content rights associated with the session initiator. Operation 2210 is executed to retrieve a referent for content. This reference may be retrieved from the content server 116. An operation 2211 is executed to store the session ID value to the database 115. An operation 2212 is executed to transmit the content session ID value to the identified session participants and/or the session initiator. This session ID value 502 is received through the execution of operation 2213. The session ID value may further include the retrieved referent to the content (see e.g., operation 2210). Operation 2214 is executed to store the session ID value and referent into a data store 2215 that may reside natively or non-natively on the cell phone 101.

FIG. 23 is a dual-stream flow chart illustrating a method 2300 used to facilitate content streaming as part of an asset sharing session. Shown are operations 2301 through 2303, and 2310 through 2311 that reside upon or that are otherwise are executed by the PDA 203. Further, shown are operations 2304 through 2309 that are executed by or otherwise reside upon the session management server 114. Shown is an operation 2301 that is executed to retrieve retrieval instructions. These retrieval instructions may be automatically retrieved by the PDA 203, or made may retrieved as the result of user input. Further, an operation 2302 is executed to retrieve a referent from a data store 2215 based upon certain identified content. An operation 2303 is executed to transmit a content request 2321 that includes the referent. Operation 2304, when executed, receives the content request 2321. Decisional operation 2305 is executed to determine whether or not the referent is recognized. A recognized referent is one that has been allocated by the server management server 114, or content server 116 for the purposes of accessing content. In cases where decisional operation 2305 evaluates to "false," an error condition is noted. In cases where decisional operation 2305 evaluates to "true," an operation 2307 is executed. Operation 2307, when executed, verifies the session participant (e.g., the PDA 203 and/or the user 202 associated with the PDA 203). Operation 2308 is executed to determine the requestor's device proximity to the content. Specifically, operation 2308 determines the proximity of, for example, the cell phone 101 to the location of the content to be streamed to the cell phone 101. Operation 2309 is executed to retrieve content from the database 115, and to initiate streaming. Operation 2310 is executed to receive the content stream 203. Operation 2311 is executed that provides the content for, for example, display on the cell phone 101. In some example embodiments, the content stream 2322 is stored into a data store for future viewing or use. In some example embodiments, a software component or module is transmitted in lieu of the content stream 2322 such that a software component or module is retrieved through the execution of operation 2309 and transmitted to the PDA 203. This software component or module may be stored into the data store 2215 for current or future use.

Figure 24:
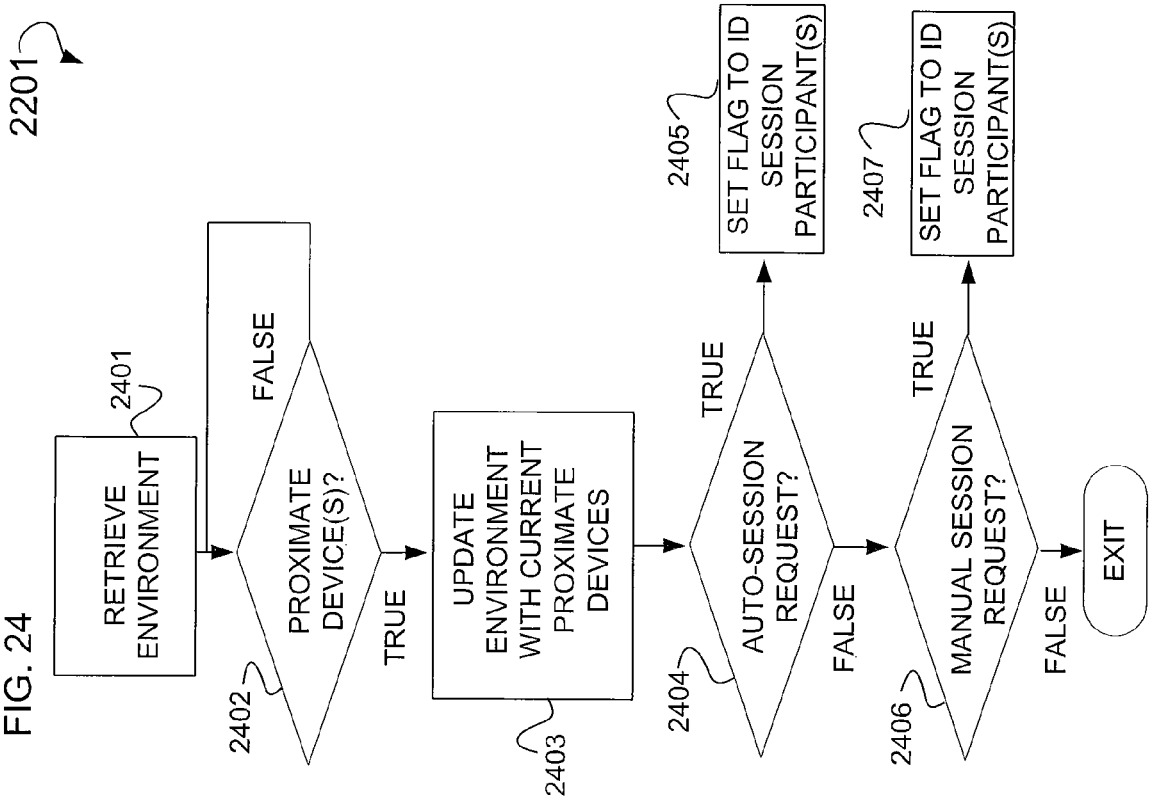
FIG. 24 is a flow chart illustrating the execution of an operation, according to an example embodiment, that receives a session request input.

FIG. 24 is a flow chart illustrating the execution of an example operation 2201. Shown is an operation 2401 that is executed to retrieve an environment. An environment illustrates physical proximity between devices in terms of GPS based coordinates and/or physical distance between devices. A decisional operation 2402 is executed that determines whether additional devices are proximate to the device executing the operation 2201. For example, through the execution of decisional operation 2402 the cell phone 101 is able to determine whether or not the devices 102 through 104 are proximate to the cell phone 101. In cases where decisional operation 2402 evaluates to "false," the decisional operation 2402 is re-executed. In cases where decisional operation 2402 evaluates to "true," operation 2403 is executed. Operation 2403, when executed, updates an environment with the current proximate devices. Specifically, when certain devices are determined to be proximate to the cell phone 101 the location of these devices is used to update the environment. A decisional operation 2404 is executed that determines whether or not an auto-session request has been set. An auto-session request is a generated by a script that, when executed, initiates a session automatically for the cell phone 101 based upon proximity to other devices as described in the environment. For example, in cases where the cell phone 101 comes within the broadcast or unicast range of the access layer device 206, the execution of decisional operation 2404 may allow the cell phone 101 to automatically seek to initiate an asset sharing session. Further, through the use of the auto-session request in combination with the environment map, the cell phone 101 is able to determine that it is proximate to another device (e.g., devices 102 through 104). The cell phone 101 may then seek to join a session within which the one or more of the devices 102 through 104 is participating. In cases where decisional operation 2404 evaluates to "true," an operation 2405 is executed. Operation 2405, when executed, sets one or more flag values to ID the session participants as part of an asset sharing session. This flag value (e.g., a boolean value) is used to denote which devices and/or users are to participate in a particular session that is being established via execution of operation 2201. In cases where decisional operation 2404 evaluates to "false," a decisional operation 2406 is executed.

Decisional operation 2406 determines whether or not a manual session request has been made. A manual session request is a session request that is manually initiated by a user through the use of an input device. In cases where decisional operation 2406 evaluates to "true," an operation 2407 is executed. Operation 2407, when executed, sets a flag value to ID session participants. As with the execution of operation 2405, operation 2407, when executed, sets a flag to denote certain participants in form of devices, or users associated with the devices, who would like to participant in the session. When decisional operation 2406 evaluates to "false," an exit condition is met.

In some example embodiments, an environment is a description of device proximity. This description of device proximity may be formatted as an XML file with fields relating to a model ID, device ID, and device location. In some example embodiments, a character delimited flat file may be used in lieu of an XML file. This environment may have the following form:

```
<ENVIRONMENT>
    <ENVIRONMENT ID> 4324ABDE1 </ENVIRONMENT ID>
        <DEVICE ID> 00188B0339E9
</DEVICE ID>
            <DEVICE LOCATION > 33214D </DEVICE
            LOCATION>
        <DEVICE ID> 00C095ECB793
</DEVICE ID>
            <DEVICE LOCATION > 33214E </DEVICE
            LOCATION>
        <DEVICE ID> 00A0C914C829
</DEVICE ID>
            <DEVICE LOCATION > 33A14D </DEVICE
            LOCATION>
</ENVIRONMENT>
```

In some example embodiments, additional fields may be added to this file reflecting the last date and time the environment was updated, asset rights for each of the respective devices, object recognition information for objects including devices, and other suitable information.

Figure 25:
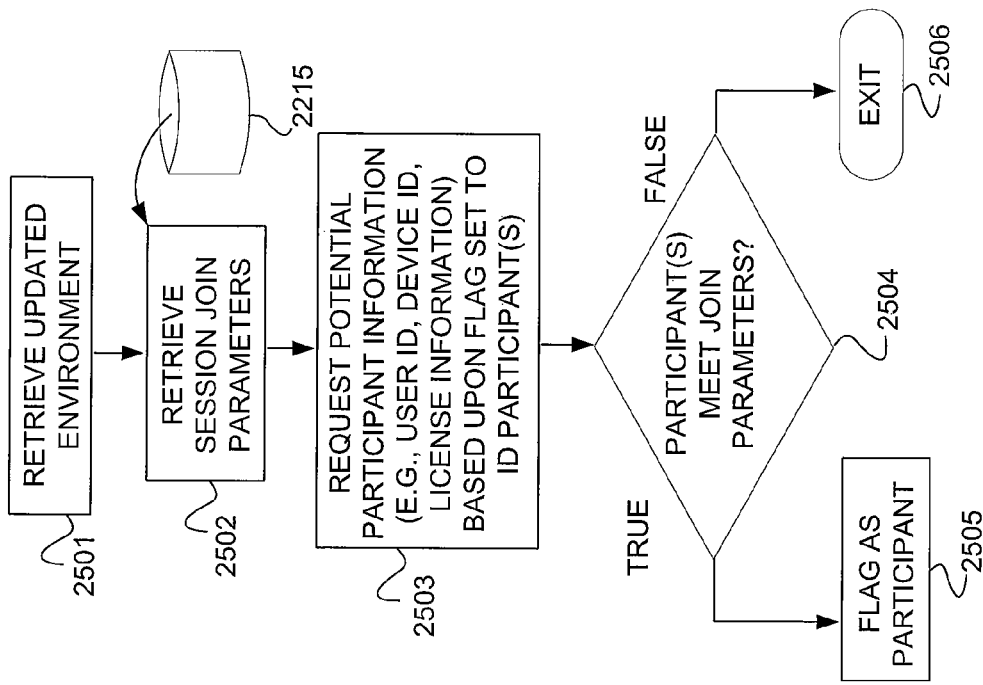
FIG. 25 is a flow chart illustrating the execution of an operation, according to an example embodiment, to identify session participants.

FIG. 25 is a flow chart illustrating the execution of an example operation 2202. Shown is an operation 2501 that, when executed, retrieves an updated environment. An operation 2502 is executed to retrieve session join parameters from the data store 2215. The session join parameters determine who may join a particular session. The parameters includes, for example, an open join where any proximate device may join a session, a list parameter where only specified devices and/or users may join a session, a "no" join parameter where no user or device may join a session. Operation 2503 is executed to request potential participant information. This participant information may include a user ID, a device ID and/or licensing information associated with the user ID, or the device ID. This operation 2503 is executed based upon the flag values set through the execution of operations 2405 and 2407. A decisional operation 2504 is executed to determine whether the participants meet the aforementioned join parameters. The cases where decisional operation 2504 evaluates to "false," an exit or termination condition 2506 is executed. In cases where decisional operation 2504 evaluates to "true," an operation 2505 is executed. Operation 2505, when executed, sets a flag value to denote a user or device as a participant in an asset sharing session.

In some example embodiments, the execution of operation 2204 includes an operation that, when executed, receives a session request where the session request includes session information. A further operation is executed that parses this session information to retrieve a current access layer device identifier (e.g., an IP address for the access layer device 206). An additional operation is executed that parses a current application information for a particular application residing upon, for example, the one or more of the PDA 203, cell phone 101, or computer 102. This application information may be a port value, or an application ID. An operation is executed that parses a device ID from the session information. This device ID may be a MAC value, an ESN value or an IMEI value associated with the PDA 203, cell phone 101, or computer 102. An operation is executed to parse a content identifier from the session information. This content identifier may be used to identify content and/or an application or application component or module that is transmitted as a part of the content stream 2322. An operation is executed that stores this parsed information (see e.g., the access layer device identifier, device ID, or application ID) for use in a timeline history. This parsed information is stored into the database 115.

In some example embodiments, the execution of operation 2304 includes receiving a content request through the execution of an operation. A further operation is executed that parses a requester ID, referent and other session information from the content request. This request for ID may be in the form of the for example a device ID or a user ID. An operation is executed that stores this parsed information for use in a timeline history. This parsed information is stored into the database 115.

Figure 26:
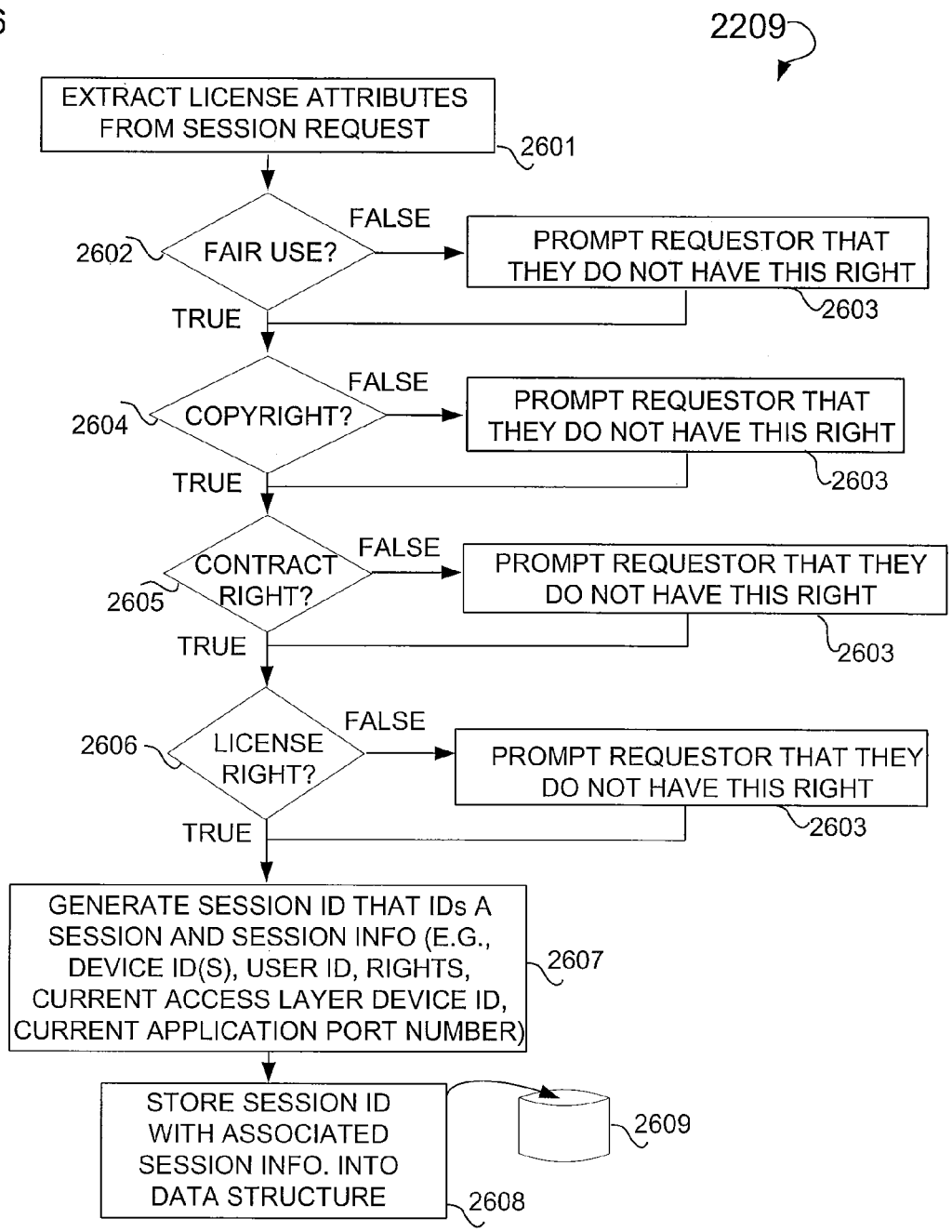
FIG. 26 is a flow chart illustrating the execution of an operation, according to an example embodiment, that checks the content rights associated with a session initiator.

FIG. 26 is a flow chart illustrating the execution of an example operation 2209. Shown is an operation 2601 that, when executed, extracts license attributes from the session request 501. These license attributes may include a fair-use attribute, a copyright attribute, a contract attribute, a licensing attribute, or some other suitable type attribute used to denote legal rights associated with a user or a device. Shown is a decisional operation 2602 executed to determine the existence of a fair-use right. When decisional operation 2602 evaluates to "false," an operation 2603 is executed. Operation 2603 is executed to prompt the requestor (e.g., the cell phone 101 and associated user) that they do not have a particular type of license attribute. In cases where decisional operation 2602 to "true," a decisional operation 2604 is executed. Decisional operation 2604 determines whether or not a requester has a copyright. In cases where decisional operation 2604 evaluates to "false," the operation 2603 is executed. In cases where decisional operation 2604 evaluates to "true," a further decisional operation 2605 is executed. Decisional operation 2605 determines whether or not a requestor has a contract right regarding a particular piece of content. In cases where decisional operation 2605 evaluates to "false," the operation 2603 is executed. In cases where decisional operation 2605 evaluates to "true," a decisional operation 2606 is executed. Decisional operation 2606 determines whether or not a requester has a license right associated with a particular piece of content. In cases where decisional operation 2606 evaluates to "true," an operation 2607 is executed. Operation 2607 is executed to generate a session ID that identifies a session and session information. The session information may include a device ID, a user ID, the existence of rights associated with content (e.g., license attributes, copyright attributes), a current access layer device ID (e.g., an IP address for the access layer device 206), a current application port number, or an application ID number. An operation 2608 is executed that stores this session ID and associated session information into a data structure that resides upon a data store 2609. This data store 2609 may be native or non-native.

FIG. 27 is a flow chart illustrating the execution of an example operation 2307. Shown is a decisional operation 2701 that, when executed, determines whether or not a change in location has occurred for a particular device and/or user associated with a device (see e.g., FIG. 3). In cases where decisional operation 2701 evaluates to "true," an operation 2702 is executed. Operation 2702, when executed, verifies a session participant, wherein this session participant has changed locations. In cases where decisional operation 2701 evaluates to "false," an operation 2703 is executed that extracts a session ID and device ID from the session request 302. Operation 2704 is executed that uses a session ID as a search key to search for a particular session within a data structure (see e.g., operation 2608 and data store 2609). A decisional operation 2705 is executed that determines whether or not a session for a particular session participant has been discovered as a part of the data structure referenced at operation 2608. In cases where decisional operation 2705 evaluates to "false," an operation 2706 is executed that transmits an error signal. This error signal may be transmitted to the PDA 203 (see e.g., FIG. 3) and informs the user of the PDA 203 that they are not entitled to join a particular session. In cases where decisional operation 2705 evaluates to "true," an operation 2707 is executed. Operation 2707 is executed to use a device ID or user ID to search for a particular session participant within an identified session (see e.g., decisional operation 2705). A decisional operation 2708 is executed to determine whether or not the participant has been discovered as being associated with a particular session. In cases where decisional operation 2708 evaluates to "false," an operation 2709 is executed. Operation 2709, when executed, informs a user of a particular device that they are not entitled to join a session. When decisional operation 2708 evaluates to "true," an operation 2710 is executed. Operation 2710 is executed to forward a verification signal in the form of a boolean value. This verification signal verifies that a user and/or device associated with the user seeking to join or rejoin a session is entitled to join the session.

FIG. 28 is a flow chart illustrating the execution of an example operation 2701. Shown is an operation 2801 that is executed to look up a session ID value and session information in, for example, the data store 2609. An operation 2802 is executed to parse access layer information from the session information. This access layer information may be information regarding the access layer device 206. Further, shown is a decisional operation 2803 that determines whether or not a change in a source IP address has occurred. In cases where decisional operation 2803 evaluates to "true," an operation 2806 is executed. In cases where decisional operation 2803 evaluates to "false," a further decisional operation 2804 is executed. Operation 2804, when executed, determines whether a hand off has occurred. In cases where decisional operation 2804 evaluates to "true," the operation 2806 is executed. In cases where decisional operation 2804 evaluates to "false," a decisional operation 2805 is executed. Decisional operation 2805 determines whether or not a change in a source port number has occurred. In cases where decisional operation 2805 evaluates to "true," the operation 2806 is executed. In cases where decisional operation 2805 evaluates to "false," a termination condition 2807 is executed. Operation 2806 is executed to transmit a location request flag. The location request flag is a boolean value signifying the need for a determination to be made regarding whether a device or user is a session participant.

FIG. 29 is a flow chart illustrating the execution of an example operation 2702. Shown is an operation 2901 that is executed to receive a location request flag. Operation 2902 is executed to extract a device identifier from the session information. Operation 2903 is executed to look up the device identifier in a data store 2609. A decisional operation 2904 is executed that determines whether or not the device is part of the session. In cases where decisional operation 2904 evaluates to "false," an operation 2905 is executed. Operation 2905, when executed, transmits an error prompt to, for example, one or more of the cell phone 101, PDA 203, or computer system 104 and users associated therewith. When decisional operation 2904 evaluates to "true," an operation 2906 is executed. Operation 2906 is executed to update the data store 2609 with information regarding the addition of a participant to a particular asset sharing session.

Figure 30:
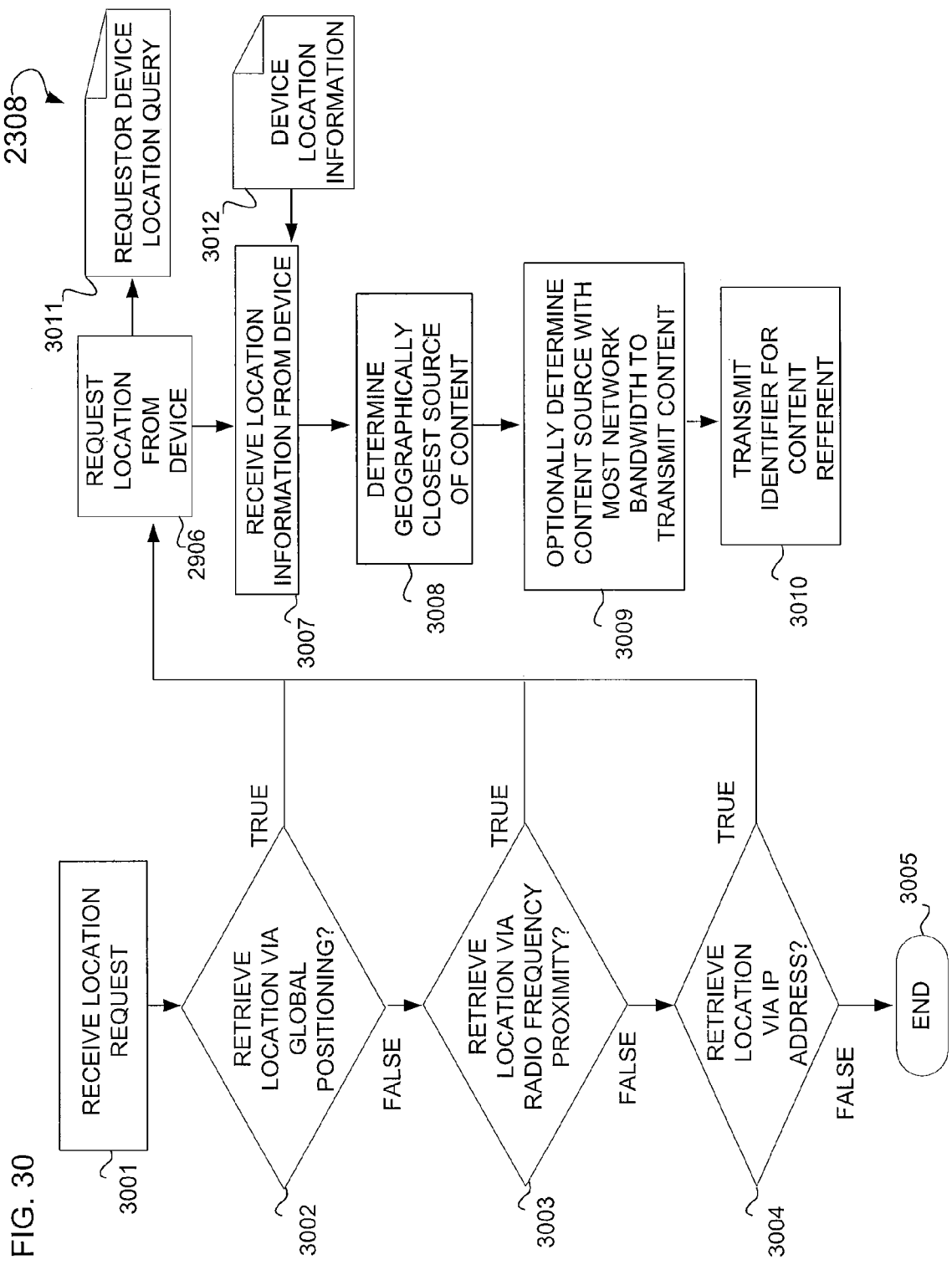
FIG. 30 is a flow chart illustrating the execution of an operation, according to an example embodiment, to determine a requestor's device proximity to the content.

FIG. 30 is a flow chart illustrating the execution of an example operation 2308. Shown is an operation 3001 that receives a location request. A decisional operation 3002 is executed to determine whether to retrieve the location via a GPS system. In cases where decisional operation 3002 evaluates to "true," an operation 3006 is executed. In cases where decisional operation 3002 evaluates to "false," a decisional operation 3003 is executed. Decisional operation 3003 determines whether to retrieve a location via a radio frequency proximity. In cases where decisional operation 3003 evaluates to "true," the operation 3006 is executed. In cases where decisional operation 3003 evaluates to "false," a decisional operation 3004 is executed. Decisional operation 3004 determines whether to retrieve a location via an IP address. In cases where decisional operation 3004 evaluates to "true," the operation 3006 is executed. In cases where decisional operation 3004 evaluates to "false," a termination condition 3005 is executed. Operation 3006 is executed to request a location from a device using, for example, a requestor device location query 3011. The location query 3011 may be a TCP/Internet Protocol (TCP/IP) formatted query. Operation 3007 is executed that receives device location information 3012 from a particular device. The device location 3012 may be a TCP/IP formatted data packet. For example, the PDA 203 depicted in FIG. 3 receives the requester device location query 3011, and transmit device location information 3012 in response to the requestor device location query 3011. Operation 3008 is executed that determines the geographically closest content source. A geographically closest content source may be the content server 116 and database 115, or one of the PDA 203, cell phone 101, or computer system 104 that have residing upon them the requested content. In some example embodiments, the streaming of the content stream 304 is facilitated by a device that is geographically closer to the cell phone 101 as compared to the content server 116 or session management server 114. Operation 3009 is optionally executed to determine a content source with the most bandwidth to transmit a particular content stream (see e.g., content stream 304). Operation 3010 is executed that transmits an identifier (e.g., a number address value) from the content referent.

Figure 31:
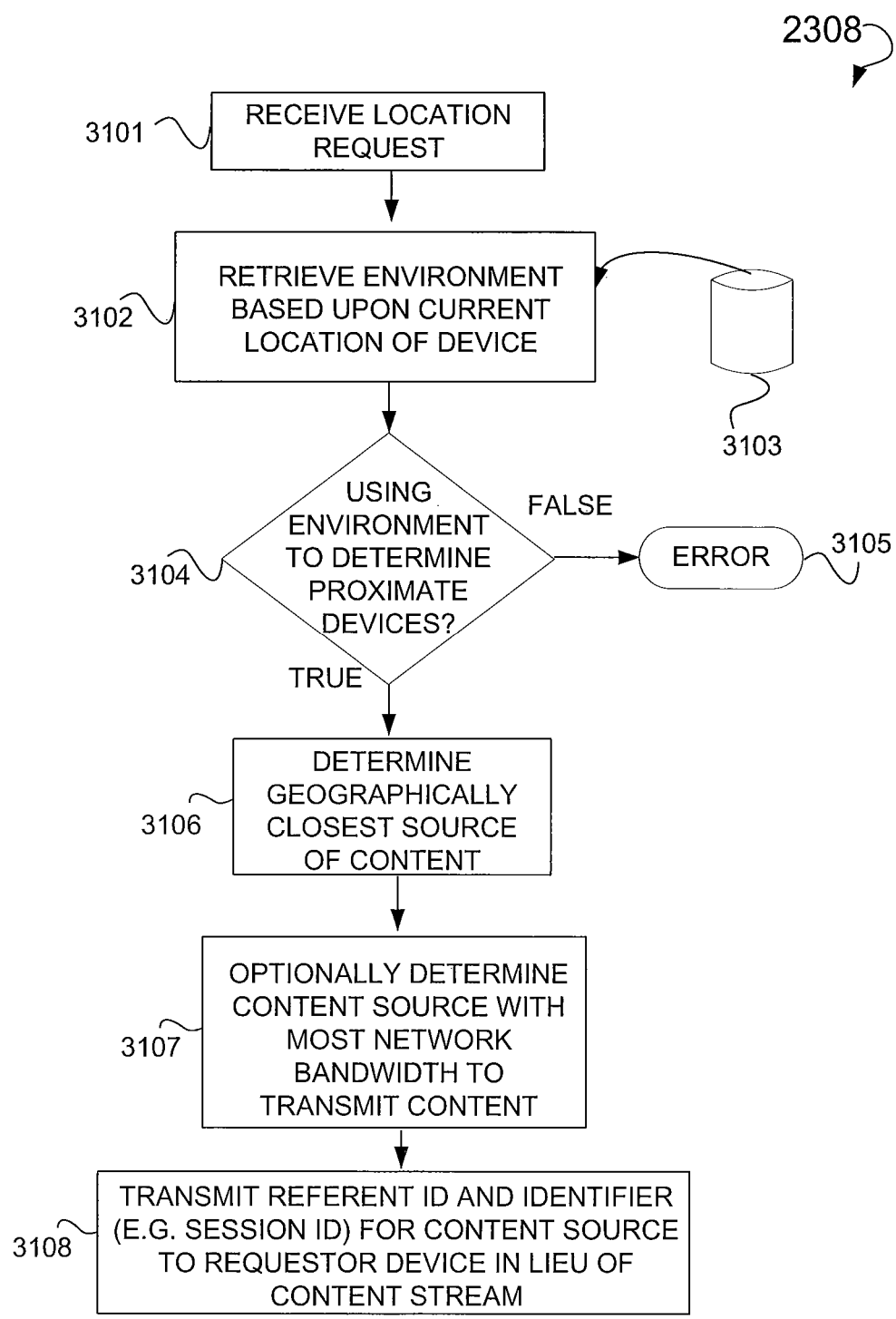
FIG. 31 is a flow chart further illustrating the execution of an operation, according to an example embodiment, to determine a requestor's device proximity to the content.

FIG. 31 is a flow chart illustrating the execution of an example operation 2308. Shown is an operation 3101 that, when executed, receives a location request. Operation 3102 is executed to retrieve an environment based upon the current location of a device. This environment is retrieved from a data store 3103. A decisional operation 3104 is executed that uses this environment to determine whether or not a device is proximate. For example, through the execution of decisional operation 3104, a determination is made as to whether the PDA 203 depicted in FIG. 3 is proximate to the content server 116, the session management server 114, or some other device that may be able to provide the content stream 304 to the PDA 203. In cases where decisional operation 3104 evaluates to "false," an error condition in form of error condition 3105 is executed. In cases where decisional operation 3104 evaluates to "true," an operation 3106 is executed. Operation 3106 is executed to determine the geographically closest source of content. Operation 3107 is optionally executed to determine which content source has the greatest amount of bandwidth to provide a content stream 304 to, for example, the PDA 203 as depicted in FIG. 3. Operation 3108 is executed to transmit a referent ID and identifier for the content source to a requester in lieu of a content stream. In some example embodiments, a referent may be transmitted in lieu of the content stream 304 to the PDA 203 where this referent may be used by the PDA 203 at a later point.

Figure 32:
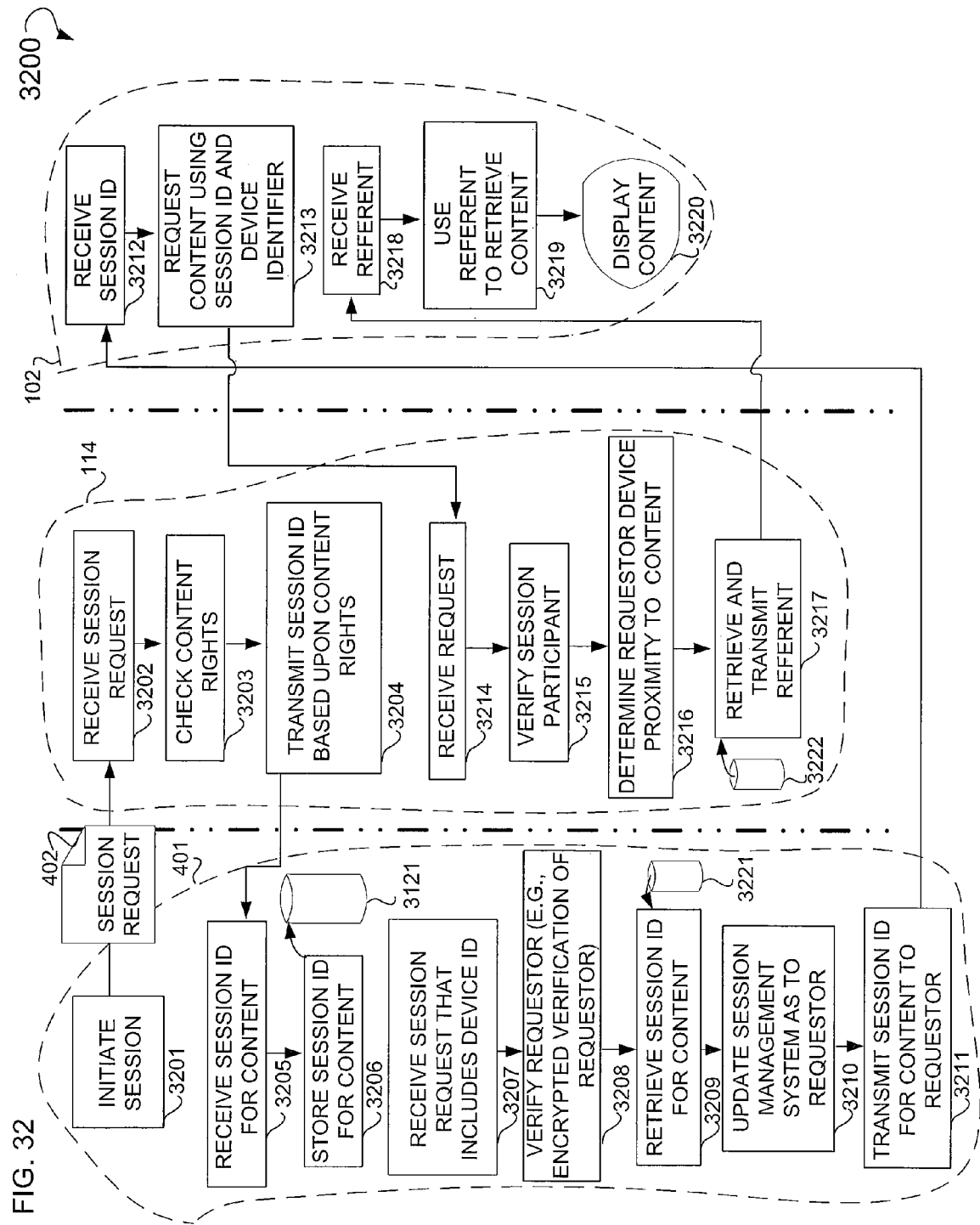
FIG. 32 is a tri-stream flow chart illustrating a method, according to an example embodiment, for asset sharing session establishment, and content streaming using a proxy.

FIG. 32 is a tri-stream flow chart illustrating a method for asset sharing session establishment, and content streaming using a proxy. Shown are operations 3201, 3205 through 3211. These various operations reside upon or are otherwise are executed by the media server 401 acting as a proxy. In some example embodiments, these various operations reside upon or otherwise are executed by the PDA 203 depicted in FIG. 5. Also shown are operations 3202 through 3204, and operations 3214 through 3217. These various operations 3202 through 3204, and 3214 through 3217 reside upon, or otherwise are executed by, the session management server 114. Also shown are operations 3212 through 3213, and operations 3218 through 3220 that reside upon or otherwise are executed by the computer 102 shown in FIG. 3. Shown is an operation 3201 executed to initiate a content session. Operation 3201 is functional similar to operation 2201. Through the execution of this operation 3201 a session request 402 is generated and transmitted. This session request 402 is received through the execution of operation 3202. Operation 3202 is functionally similar to operation 2204. An operation 3203 is executed to determine content rights associated with the initiator of the session or session requester. Operation 3203 is functionally similar to operation 2209. Operation 3204 is executed that transmits a session ID based upon the content rights determined through the execution of operation 3203. Operation 3204 is functionally similar to operation 2212. The session ID may be the session ID value 403. The session ID 403 is received through the execution of operation 3205. Operation 3205 is functionally similar to operation 2213. Operation 3206 is executed that stores a session ID for a content into a data store 3221. Operation 3206 is functionally similar to operation 2214.

In some example embodiments, an operation 3207 is executed that receives a session request that includes a device ID. This session request may be provided by the cell phone 101, computer 102 and television 104 shown in FIG. 4. An operation 3208 is executed that verifies the identity of a particular requester. This verification may take the form of symmetric, or asymmetric encryption, a digital signature, or some other suitable verification methodology. An operation 3209 is executed that retrieves a session ID value for a piece of content such as the session ID value 403. This session ID is retrieved from the data store 3221. An operation 3210 is executed that updates a session management system 114 as to a particular requestor's identity. In some example embodiments, through the execution of operation 3210, the session management server 114 is updated. An operation 3211 is executed that transmits a session ID value for content to a particular requester. This session ID value is received through the execution of operation 3212. Operation 3213 is executed to request content using the session ID value and device ID value. In some example embodiments, a user ID value is also provided to request content. An operation 3214 is executed to receive the request for content. An operation 3215 is executed to verify the participant or the requester (e.g., the computer 102 and user associated therewith). An operation 3216 is executed to determine the requestor device's proximity to a particular piece of content. An operation 3217 is executed to retrieve and transmits a referent and/or a content stream to be received through the execution of operation 3218. Operation 3219 is executed to use the referent to retrieve the content where a referent is provided through the execution of operation 3217. Operation 3220 is executed to display the content as a part of a content stream.

Figure 33:
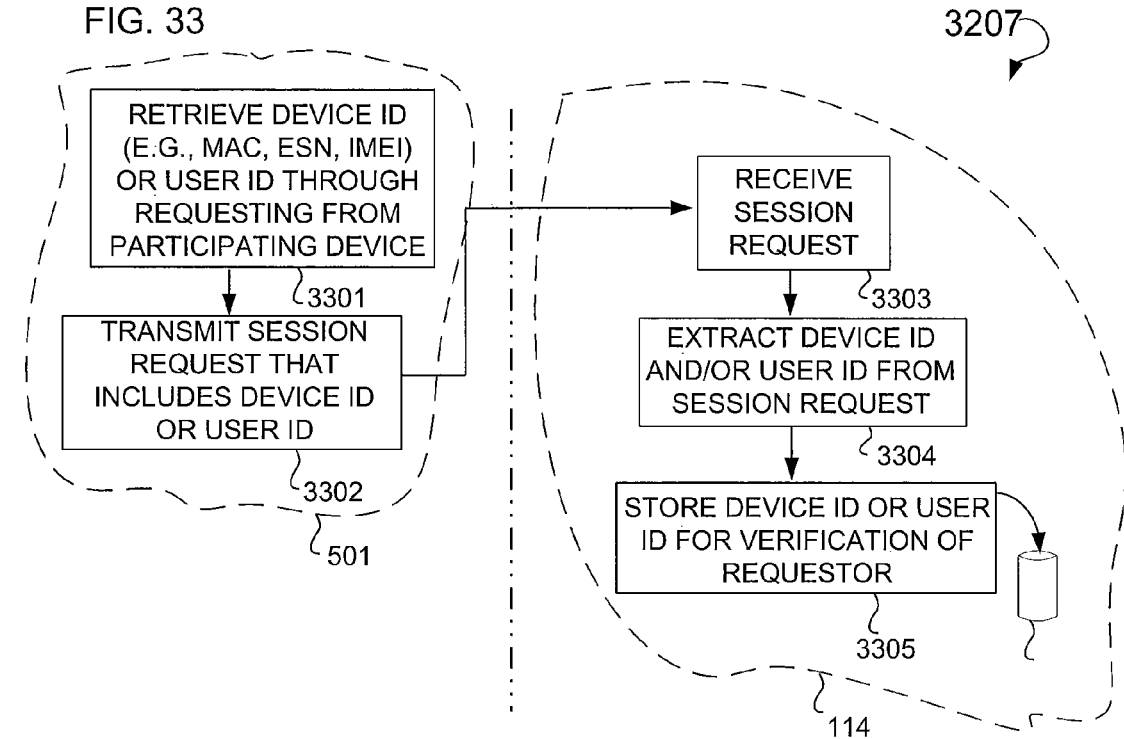
FIG. 33 is a dual-stream flow chart illustrating the execution of an operation, according to an example embodiment, that receives a session request that includes a device ID.

FIG. 33 is a dual-stream flow chart illustrating the execution of an example operation 3207. Shown are operations 3301 through 3302 that are executed by the media server 401 to verify the identity of a particular requester. Further, shown are operations 3303 through 33 05 that are executed by the session management server 114. Operation 3301 is executed by the media server 401 to retrieve a device ID or user ID through requesting this information from a particular participating device. For example, as illustrated in FIG. 4 this device ID or user ID may be retrieved by the media server 401 from the one or more devices 101 through 104. Similarly, as depicted in FIG. 5, this device ID or user ID may be retrieved by the PDA 203. Operation 3302 is executed to transmit a session request that includes the device and/or user ID. The session request is received through the execution of operation 3303. Operation 3304 is executed to extract the device ID and/or user ID from the session request. The session request may be the session request 402 or 501. Operation 3305 is executed to store the device ID or user ID for verification purposes into the data store.

Figure 34:
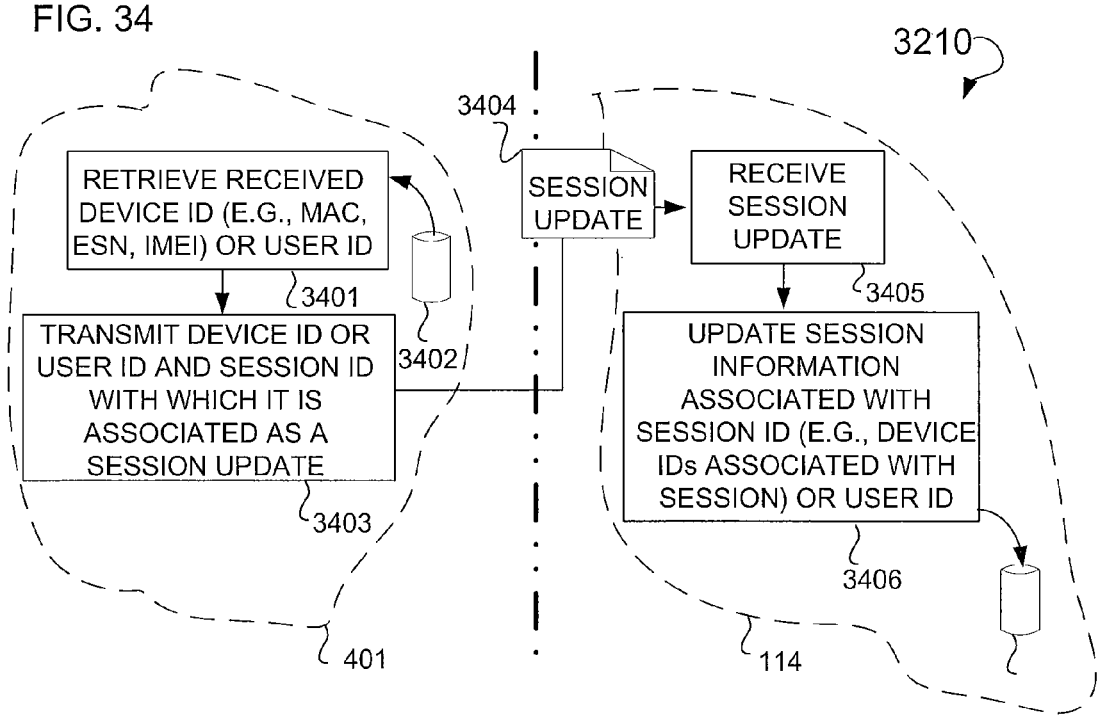
FIG. 34 is a dual-stream flow chart illustrating the execution of an operation, according to an example embodiment, that updates a session management system as to a particular requestor's identity.

FIG. 34 is a dual-stream flow chart illustrating the execution of an example operation 3210. Shown is an operation 3401 and 3403 that are executed by the media server 401, or the PDA 203 shown in FIG. 5. Further, shown is an operation 3405 and operation 3406 that are executed by the session management server 114. Operation 3401 is executed to retrieve a device ID or user ID from the data store 3402. Operation 3403 is executed to transmit the device ID, user ID and session ID as part of a session update. This session update 3404 is received through the execution of operation 3405. Operation 3406 is executed to store this session update information associated with a particular session ID, or user ID into the data store.

Figure 35:
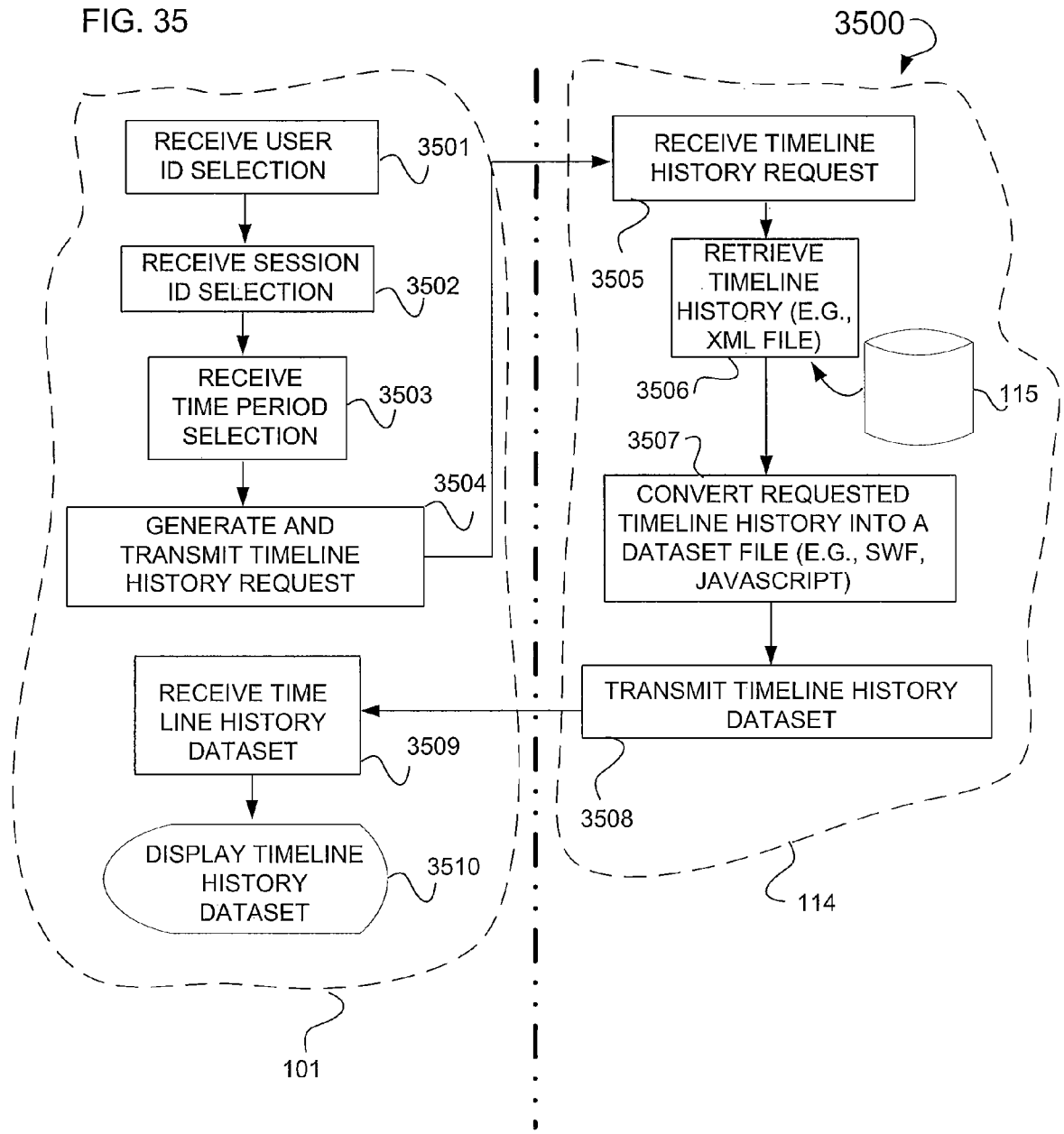
FIG. 35 is a dual-stream flow chart illustrating a method, according to an example embodiment, used to retrieve a timeline history.

FIG. 35 is a dual-stream flow chart illustrating an example method 3500 used to retrieve a timeline history. Shown are operations 3501 through 3504, and 3509 through 3510. These various operations maybe executed by the cell phone 101. Further, shown are operations 3505 through 3508 that are executed by the session management server 114. Operation 3501 is executed to receive a user ID selection. Operation 3502 is executed to receive a session ID selection. Operation 3503 is executed to receive a time period selection. In some example embodiments, the user ID selection, session ID selection and time period selection may be received individually from a user associated with the cell phone 101. Operation 3504 is executed to generate and transmit a timeline history request. This timeline history request is received through the execution of operation of 3505. Operation 3506 is executed to retrieve a timeline history from the data store 115. This timeline history may be in the form of metadata such as XML formatted data. Operation 3507 is executed to convert this timeline history into a script file where a script file may be formatted as for example a Shock-Wave-Flash (SWF) file, a JavaScript file, an ActionScript file, or some other suitable file formatted through the use of a scripting language. Operation 3508 is executed that transmits this timeline history dataset. Operation 3509 is executed that receives the timeline history dataset. Operation 3510 is executed that displays the timeline history dataset. This operation 3501 may an interpreter capable of interpreting a script, and displaying the results of this interpretation visually to on the PDA 203.

Figure 36:
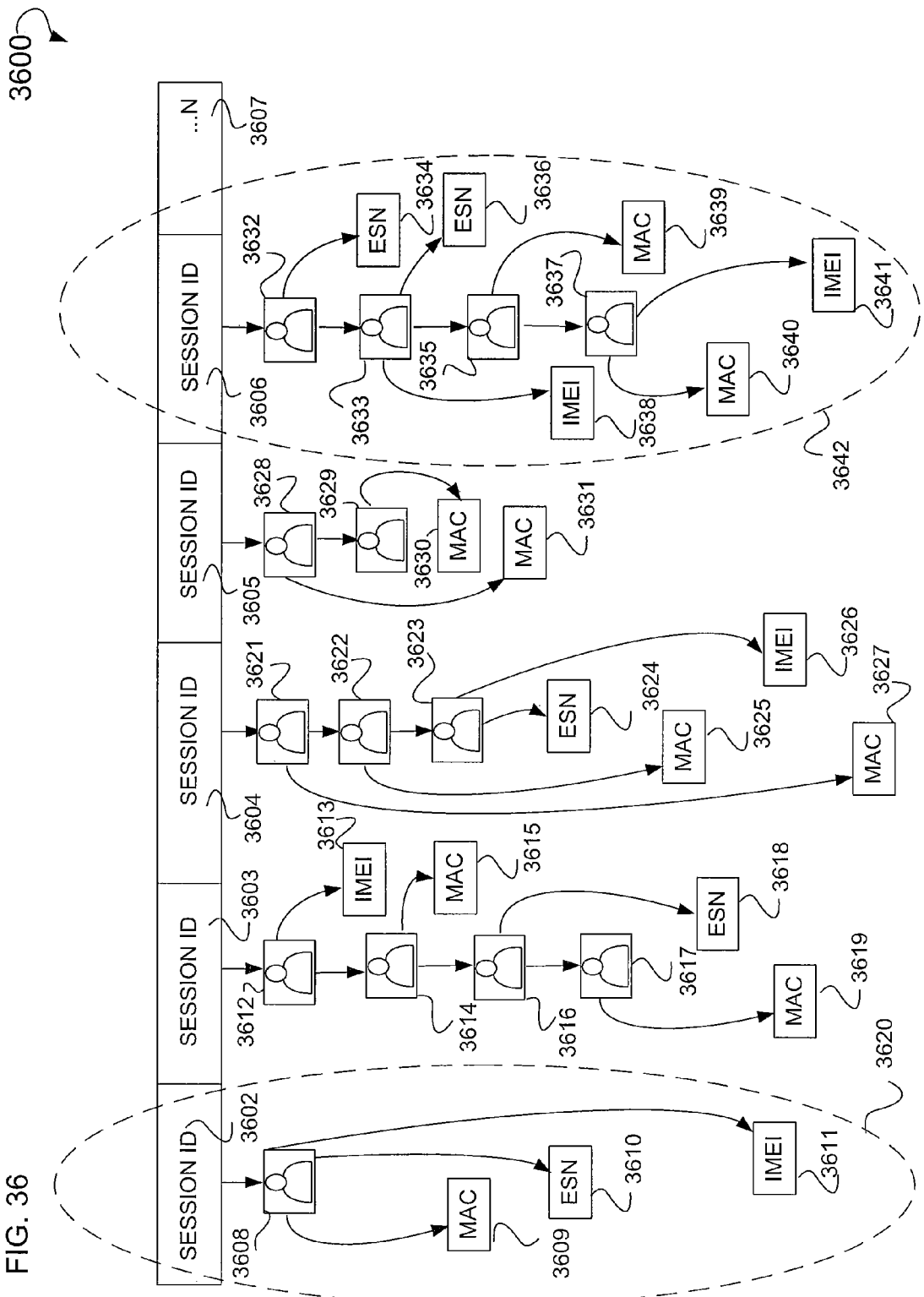
FIG. 36 is a data structure, according to an example embodiment, in the form of a hash table used to organize session IDs, user IDs and device IDs.

FIG. 36 is a data structure 3600 in the form of a hash table used to organize session IDs, user IDs and device IDs. This hash table utilizes bucket hashing. Shown are various hash table entries 3602 through 3607. Associated with the hash table entry 3602, here represented as a session ID, is a user ID 3608. Associated with this user ID 3608 is a node 3609 in the form of a MAC address. Associated with this user ID 3608 is a node 3610 in the form of an ESN value. Additionally, associated with this user ID 3608 is a node 3611 in the form of IMEI value. Collectively, the user ID 3608, and its associated nodes 3609 through 3611, may be referenced at 3620 as session information for an individual user session. Further, shown is a hash table entry 3603 in the form of a session ID. Associated with this hash table entry 3603 is a user ID 3612. Associated with this user ID 3612 is a node 3613 in the form of an IMEI value. Further, a user ID 3614 is shown that has associated with it a node 3615 in the form of a MAC address. Moreover, illustrated is user ID 3616 that has associated with it a node 3618 in the form of an ESN address. Additionally, a user ID 3617 is shown that associated with it a node 3619 in the form of a MAC address. These various user IDs 3612, 3614, 3616 and 3617 and their respective associated nodes 3613, 3615, 3618, and 3619 are associated with the hash table entry 3603. Also shown is a hash table entry 3604 in the form of a session ID. Associated with this hash table entry 3604 is a user ID 3621. Associated with the user ID 3621 is a node 3627 in the form of a MAC address. Additionally, associated with the hash table entry 3604 is a user ID 3622 that has an associated node 3625 in the form of a MAC address. Additionally, a user ID 3623 is shown that has associated with it a node 3624 in the form of ESN address. These user IDs 3621 through 3623, and their respective associated nodes 3624 through 3627, are associated with the hash table entry 3604.

In some example embodiments, illustrated is a hash table entry 3605 in the form of a session ID. Associated with this hash table entry 3605 is a user ID 3628. Associated with the user ID 3628 is a node 3631 in the form of a MAC address. Further, a user ID 3629 is shown that has an associated node 3630 in the form of a MAC address. Also shown is a hash table entry 3606 in the form of a session ID. Associated with this hash table entry 3606 is a user ID 3632 that has associated with it a node 3634 in the form of an ESN value. Also, shown is a user ID 3633 that has associated with it a node 3636 in the form of an ESN value. Further, associated with the user ID 3633 is a node 3638 in the form of an IMEI address. Additionally, a user ID 3635 is shown that associated with it a node 3639 in the form of a MAC address. Also, shown is a user ID 3637 that has associated with it a node 3640 in the form of a MAC address. Also shown is a node 3641 in the form of a IMEI value that is associated with the user ID 3637. The user IDs 3632, 3633, 3635 and 3637 and their associated respective nodes 3634, 3636, 3638, 3639, 3640, and 3641 are associated with the hash table entry 3603. Further, these various user IDs and nodes associated with the hash table entry 3606 may be collectively referenced at 3642 as session information. The data structure 3600 may be represented by a hash table using clustering, a binary-search tree, a red-black tree, or some other suitable data structure capable of amortized $\Omega(1)$ or $\Omega(n \log n)$ performance.

In some embodiments, the hash table entry 3605 has associated with it a session ID that has associated with it an attribute in the form of a session join parameter, and a session privilege. A session join parameter, as previously illustrated, may include an open-session join parameter, a list join parameter, or a closed-join parameter. A session privilege may include privileges related to portions of the content stream 303 or 304 that a particular session participant may have access to play. In some example embodiments, a user ID 3536 has attributes that include, for example, a license attribute, a copyright attribute, a fair use attribute, a contract attribute, a product ID, a license restriction and the user ID value. Additional suitable attributes may also be included. In some example embodiments, the node 3638 in the form of a device ID has attributes include, for example, port number and IP number and access later device ID (e.g., an IP address), a recent activity flag and an application ID. Additional suitable attributes may also be included.

Figure 37:
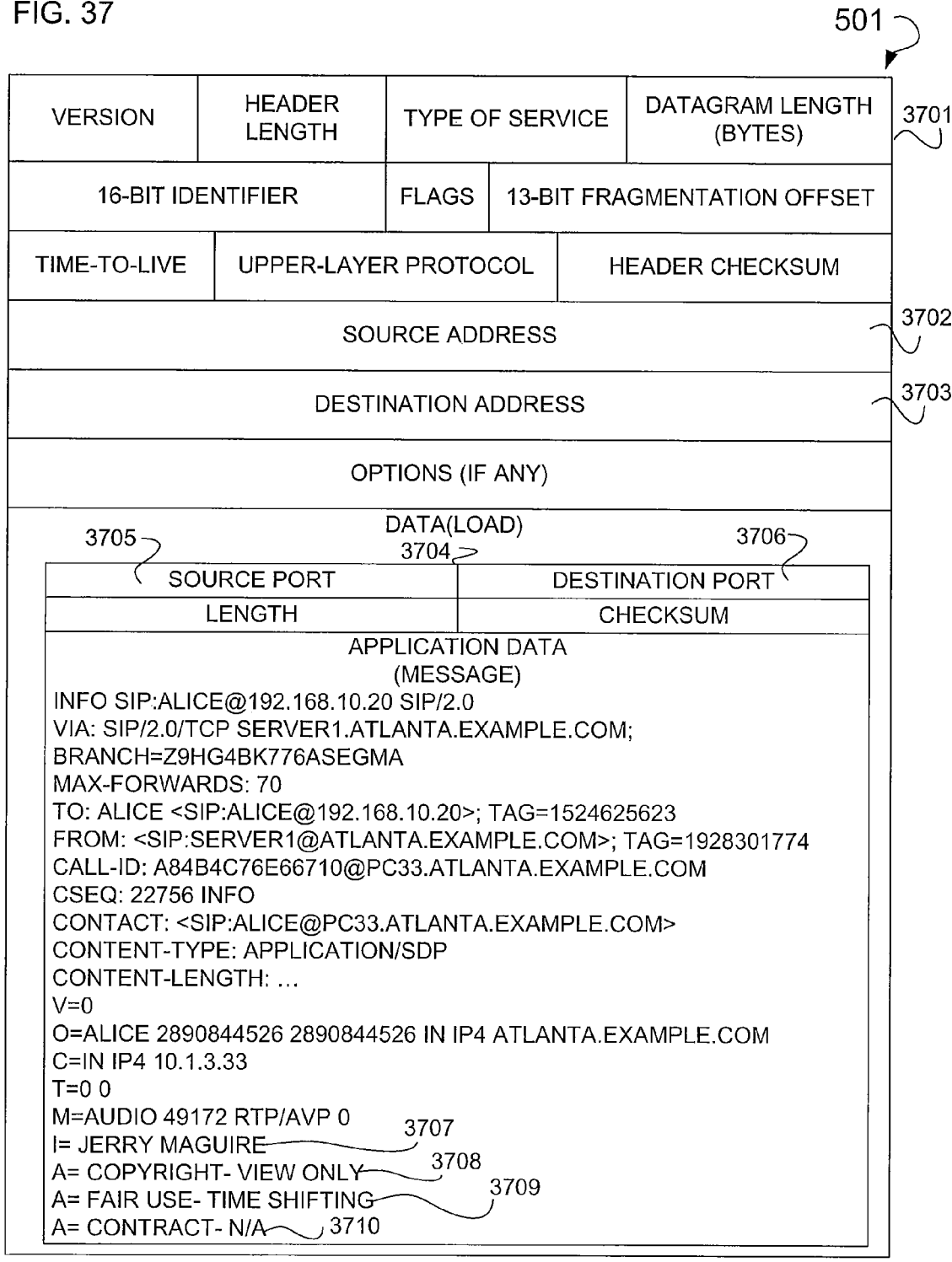
FIG. 37 is a diagram of a session request, according to an example embodiment.

FIG. 37 is a diagram of an example session request 501. In some example embodiments, a session request 501 is formatted as a TCP/IP packet. Illustrated at 3701 is the header portion of an Internet Protocol version 4 (IPv4) packet. This IPV4 packet includes a field 3702 and a field 3703. Field 3704 corresponds to a source address for, for example, the access layer device 206 shown in FIG. 3, or the PDA 203 illustrated in FIG. 5. With respect to the field 3703, this field includes the destination address of, for example, the session management server 114. Also, shown is a data load as a part of the IPv4 packet header 3701 that includes a TCP packet 3704. Illustrated as a part of this TCP packet 3704, is a source port 3705. This source port 3705 may be an identifier for a software agent residing upon one or more of the devices 101 through 104 that is used to initiate and participant in an asset sharing session. Also shown is a destination port field 3706 that references a destination port associated with session management software executed by the session management server 114. An example of agent software includes the various operations 2201 through 2203, and 2213 through 2214 illustrated in FIG. 22. Additionally, this agent software includes the various operations 2301 through 2303, and 2310 through 2311 illustrated in FIG. 23. Further, session management software includes, for example, the various operations 2204 through 2212 illustrated in FIG. 22, and operations 2304 through 2309 illustrated in FIG. 23.

In some example embodiments, illustrated as a part of this TCP packet 3704 is information written using SDP. This information includes, for example, session information denoted at 3707 and attributes associated with this session denoted at 3708 through 3710. For example, the session information denotes a particular title for a particular piece of content here the title being "Jerry Maguire" denoted at 3707. Attributes regarding this particular session information, and the content included therein, may be shown where these attributes relate to particular content rights. For example, at attribute 3708 a copyright is shown that user and/or device may only have an ability to view the content illustrated at 3707. Further, the user or device may have a fair use right in the form of time shifting as illustrated at attribute 3709. Further, the user may not have any contract right associated with the content illustrated at 3707. This contract attribute is illustrated at 3710. In lieu of using string or textual based descriptions of particular content rights associated with a particular piece of content a boolean value and appropriate identifier may be used and associated with the attributes 3708 through 3710. Through the use of these attributes that are a part of an SDP session, information may be provided where the session information may include device IDs, user IDs, session IDs or other suitable session information that is necessary for session establishment and/or content streaming.

Example Database

Some embodiments may include the various databases or data stores (e.g., 111, 115, and 120) being relational databases, or, in some cases, On Line Analytic Processing (OLAP)-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 38:
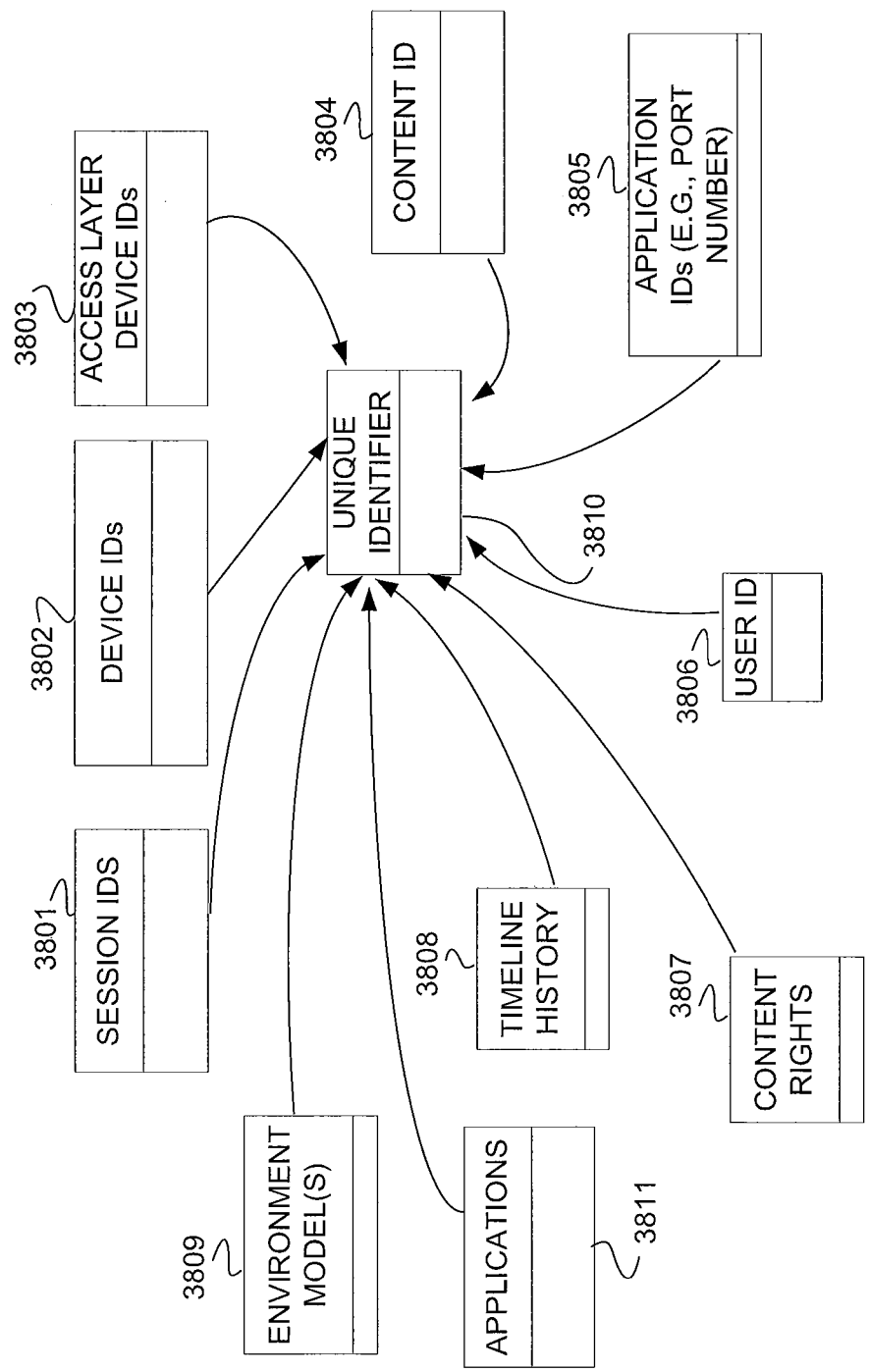
FIG. 38 is a Relational Data Schema (RDS), according to an example embodiment, illustrating various tables and data associated therewith.

FIG. 38 is an example Relational Data Schema (RDS) 3800 illustrating various tables and data associated therewith. Shown is a table 3801 that includes session IDs. These session IDs may be stored as an integer, long integer, or other suitable data type capable of storing a 128-bit value. Further, shown is a table 3802 that includes device IDs. These device IDs may be stored as an integer, long integer or other suitable value capable of storing a device ID in the form of a MAC address, an ESN value or an IMEI value. Also shown is a table 3803 that is capable of storing access layer device IDs. These access layer device IDs may be stored as an integer, long integer, float, double, XML, or other suitable data type. A table 3804 is shown that contains content IDs. These content IDs may be stored as an integer, string or other suitable data type. In some example embodiments, an XML data type is used to store data into the table 3804. Further, shown is table 3805 that is used to store application IDs. An integer, XML, or other suitable data type maybe used to store data into the table 3805. A table 3806 is shown that includes user IDs. An integer, XML, string or other suitable data type may be used to store data into the table 3806. A table 3807 is shown that includes content rights. These content rights may be stored as an XML data type, a boolean data type, or some other suitable data type. A table 3808 is shown that stores timeline history. This timeline history may be stored as an XML data type or some other suitable data type. A table 3809 is shown that includes environments. These environments may be stored as an XML data type, a Binary Large Object (BLOB), or some other suitable data type. A table 3810 is shown that includes various key values used to uniquely identify the various entries or tuples associated with each of the tables 3801 through 3809.

A Computer System

FIG. 39 shows a diagrammatic representation of a machine in the example form of a computer system 3900 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 3900 includes a processor 3902 (e.g., a CPU, a Graphics Processing Unit (GPU) or both), a main memory 3901, and a static memory 3906, which communicate with each other via a bus 3908. The computer system 3900 may further include a video display unit 3910 (e.g., a Liquid Crystal Display (LCD) or a Cathode Ray Tube (CRT)). The computer system 3900 also includes an alphanumeric input device 3917 (e.g., a keyboard), a User Interface (UT) (e.g., GUI) cursor controller 3911 (e.g., a mouse), a drive unit 3916, a signal generation device 3918 (e.g., a speaker) and a network interface device (e.g., a transmitter) 3920.

The disk drive unit 3916 includes a machine-readable medium 3922 on which is stored one or more sets of instructions and data structures (e.g., software) 3921 embodying or used by any one or more of the methodologies or functions illustrated herein. The software instructions 3921 may also reside, completely or at least partially, within the main memory 3901 and/or within the processor 3902 during execution thereof by the computer system 3900, the main memory 3901 and the processor 3902 also constituting machine-readable media.

The instructions 3921 may further be transmitted or received over a network 3926 via the network interface device 3920 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).).

What is claimed is:

1. A computer-implemented method comprising:
storing device information identifying a first plurality of network devices of a first user;
identifying a first network device of the first plurality of network devices as being active on a network and participating in an asset sharing session involving the streaming of content from a network-based server to the first network device;
determining that the first network device of the first user is within physical proximity of a second network device of a second user; and
automatically providing data pertaining to the asset sharing session within which the first user is participating to the second network device based on the determination that the first network device is active and in physical proximity of the second network device, wherein the data pertaining to the asset sharing session is to enable the second network device to participate in the asset sharing session by receiving a stream of the content from the network-based server so long as the second network device remains in physical proximity of the first network device.

2. The computer-implemented method of claim 1, wherein the providing of the data pertaining to the asset sharing session to the second network device of the second user includes providing state information to the second network device so as to migrate a state of the asset sharing session between the first network device and the second network device of the second user.

3. The computer-implemented method of claim 1, further comprising storing a plurality of assets to be network-accessible by the first plurality of network devices, wherein at least one asset is content that can be streamed from a content server to one or more of the plurality of network devices.

4. The computer-implemented method of claim 3, wherein the asset includes at least one of an application or content.

5. The computer-implemented method of claim 1, wherein the providing of the data pertaining to the asset sharing session includes providing notifications pertaining to the asset sharing session to the first network device.

6. The computer-implemented method of claim 1, wherein the identifying of the first network device as being active includes establishing a plurality of connections with the first plurality of network devices respectively, and receiving activity information from the first plurality of network devices via the plurality of connections.

7. The computer-implemented method of claim 1, wherein the providing of the data to the second network device includes customizing the data for the second network device to which the data pertaining to the asset sharing session is provided.

8. The computer-implemented method of claim 1, wherein the providing of the data pertaining to the asset sharing session within which the first user is participating includes customizing the data according to user profile information for the second user.

9. The computer-implemented method of claim 8, wherein the user profile information includes user preference information.

10. The computer-implemented method of claim 1, wherein identifying that the first network device is active includes at least one of receiving input through an input device, or receiving input through an accelerometer.

11. The method of claim 1, wherein the streaming of content from a network-based server to the first device includes causing the display of the content on the first network device and wherein providing of the data pertaining to the asset sharing session includes causing the display of the content on the second network device so as to migrate a state of the asset sharing session between the first network device and the second network device.

12. A computer system comprising:
a processor-implemented storage engine to store device information that identifies a first plurality of devices of a first user;
a processor-implemented identification engine to identify a first device of the first plurality of devices as being active on a network and participating in an asset sharing session involving the streaming of content from a network-based server to the first network device;
a proximity engine to determine that the first network device of the first user is within physical proximity of a second network device of a second user; and
a processor-implemented selection engine to selectively provide data that pertains to the asset sharing session, within which the first user is a participant, automatically to the second device based on the determination that the first network device is active and in physical proximity of the second network device, the data pertaining to the asset sharing session to enable the second network device to participate in the asset sharing session by receiving a stream of the content from the network-based server so long as the second network device remains in physical proximity of the first network device.

13. The computer system of claim 12, wherein the processor-implemented selection engine is to selectively provide state information to the second network device so as to migrate a state of the asset sharing session between the first network device and the second network device of the second user.

14. The computer system of claim 12, further comprising an additional processor-implemented storage engine to store a plurality of assets to be network-accessible by the first plurality of network devices, and wherein the providing of the data that pertains to the asset sharing session includes providing data to enable the second network device to access an asset of the plurality of assets.

15. The computer system of claim 14, wherein the asset includes at least one of an application or content.

16. The computer system of claim 12, wherein the processor-implemented selection engine is to selectively provide notifications that pertain to the asset sharing session to the first network device.

17. The computer system of claim 12, wherein the processor-implemented identification engine is to identify the first device as being active, to facilitate the establishment of a plurality of connections with the plurality of devices respectively, and to receive activity information from the plurality of devices via the plurality of connections.

18. The computer system of claim 12, wherein the processor-implemented selection engine is to customize the data according to user profile information for the first user.

19. The computer system of claim 18, wherein the user profile information includes user preference information.

20. The computer system of claim 12, wherein the processor-implemented identification engine is to identify the first device as active and to at least one of receive input through an input device, or receive input through an accelerometer.

21. A non-transitory machine-readable medium storing instructions, which, when executed by one or more processor-based machines, cause the one or more processor-based machines to perform the following operations:
- store device information identifying a first plurality of devices of a first user;
- identify a first device of the first plurality of devices as being active on a network and participating in an asset sharing session involving the streaming of content from a network-based server to the first network device;
- determine that the first network device of the first user is within physical proximity of a second network device of a second user; and
- automatically provide data pertaining to the asset sharing session, within which the first user is participating, to the second device based on the determination that the first device is active and in physical proximity of the second network device, wherein the data pertaining to the asset sharing session is to enable the second network device to participate in the asset sharing session by receiving a stream of the content from the network-based server so long as the second network device remains in physical proximity of the first network device.

* * * * *